(12) United States Patent
Bauer

(10) Patent No.: US 10,490,103 B1
(45) Date of Patent: Nov. 26, 2019

(54) ELECTRICAL WIRING TRAINING KIT AND METHOD OF TRAINING

(71) Applicant: REALITYWORKS, INC., Eau Claire, WI (US)

(72) Inventor: Jeremiah R. Bauer, Mondovi, WI (US)

(73) Assignee: Realityworks, Inc., Eau Claire, WI (US)

( * ) Notice: Subject to any disclaimer, the term of this patent is extended or adjusted under 35 U.S.C. 154(b) by 234 days.

(21) Appl. No.: 15/812,217

(22) Filed: Nov. 14, 2017

Related U.S. Application Data

(60) Provisional application No. 62/421,549, filed on Nov. 14, 2016.

(51) Int. Cl.
| | |
|---|---|
| *G09B 23/18* | (2006.01) |
| *H02G 3/12* | (2006.01) |
| *G09B 5/00* | (2006.01) |
| *G09B 19/00* | (2006.01) |
| *H01R 25/00* | (2006.01) |

(52) U.S. Cl.
CPC .............. *G09B 23/183* (2013.01); *G09B 5/00* (2013.01); *G09B 19/0069* (2013.01); *G09B 23/181* (2013.01); *H02G 3/123* (2013.01); *H01R 25/006* (2013.01)

(58) Field of Classification Search
USPC .......................... 434/224, 301, 365, 366, 379
See application file for complete search history.

(56) References Cited

U.S. PATENT DOCUMENTS

| | | | | |
|---|---|---|---|---|
| 4,091,550 A | * | 5/1978 | Schrenk | G09B 23/183 434/219 |
| 4,650,425 A | * | 3/1987 | McGarry | G09B 25/02 248/639 |
| 4,776,798 A | * | 10/1988 | Crawford | G09B 19/0053 434/224 |
| 4,943,238 A | * | 7/1990 | Gregorio | G09B 19/00 324/537 |
| 5,154,615 A | * | 10/1992 | Joubert | G09B 23/188 434/301 |
| H001273 H | * | 1/1994 | Novick | 434/224 |
| 5,562,454 A | * | 10/1996 | Kanzaki | G09B 9/00 434/118 |
| 6,048,208 A | * | 4/2000 | Hoover | G09B 23/188 434/224 |
| 6,910,894 B2 | * | 6/2005 | Basconi | G09B 1/02 174/260 |
| 7,144,255 B2 | * | 12/2006 | Seymour | H01R 13/627 439/49 |
| 9,620,031 B2 | * | 4/2017 | Schietinger | G09B 25/025 |

\* cited by examiner

*Primary Examiner* — Kurt Fernstrom

(74) *Attorney, Agent, or Firm* — Sherrill Law Offices, PLLC

(57) ABSTRACT

A system for assessing electrical wiring skills that includes an electrical assessment circuit for transmitting a unique power signal through each of the hot, neutral and ground wires in an electrical circuit, whereby correctness of wired connections can be detected and wiring defects can be reported with an identification of the specific wire or wires that are incorrectly connected.

3 Claims, 29 Drawing Sheets

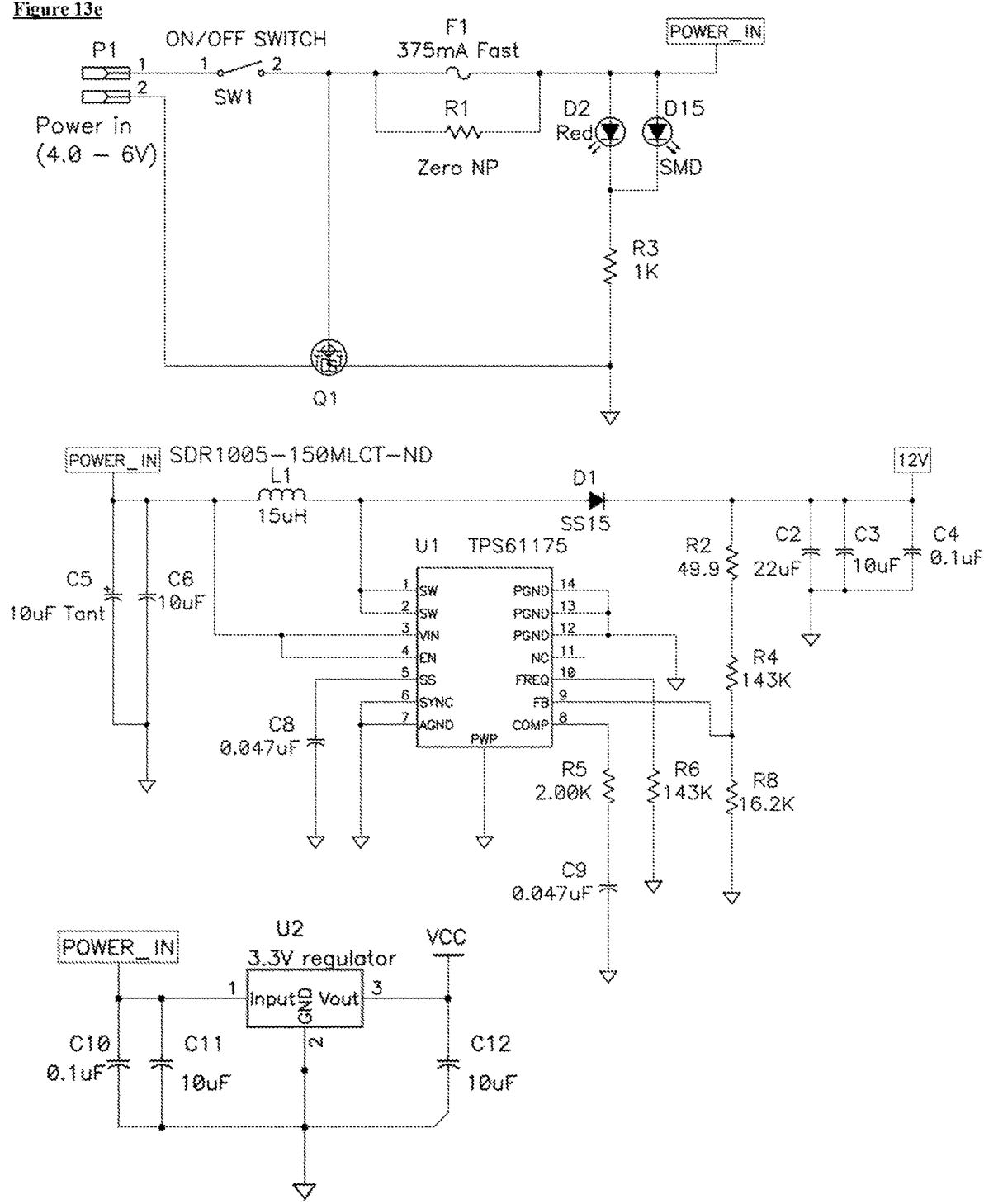

19

Electrical Wiring Kit

Student Exercises

FIGURE 16A

Table of Contents

Exercise One – Single Outlet ................................................................................................................................... 3
Exercise Two – Two Outlets in Different Boxes .................................................................................................... 3
Exercise Three – Single-Pole Switch Controlling One Light ................................................................................ 4
Exercise Four – Single-Pole Switch Controlling Two Lights ................................................................................ 4
Exercise Five – Two Single-Pole Switches Controlling Two Lights .................................................................... 5
Exercise Six – Outlet, Light with a Pull Chain – Power Through Outlet ............................................................. 6
Exercise Seven – Single-Pole Switch, Light, and Outlet using 14-3 ................................................................... 6
Exercise Eight – Switch in a Double Gang Box with a Light in Another Box, Power from Light ..................... 7
Exercise Nine – 3-Way Switches with a Light ........................................................................................................ 8
Exercise Ten – 3-Way Switches with a Light, Power through Light .................................................................... 8
Exercise Eleven – 3-Way Switches with a Light, Power Entry through both Switches First ............................ 9
Exercise Twelve – 3-Way Switches with a Light, with Power Entry through Light First then Switches in Series ..................... 9
Enhancement Exercise One – Two Single-Pole Switches with Two Lights, with Power Entry through a Light ................... 10
Enhancement Exercise Two – 3-Way Switches with Two Lights, with Power Entry Through Switches ................................. 10
Enhancement Exercise Three – Single-Pole Switch with Two Lights and Two Outlets, Power through Switch .................... 11
Enhancement Exercise Four – Split-Circuit Outlet ............................................................................................. 11

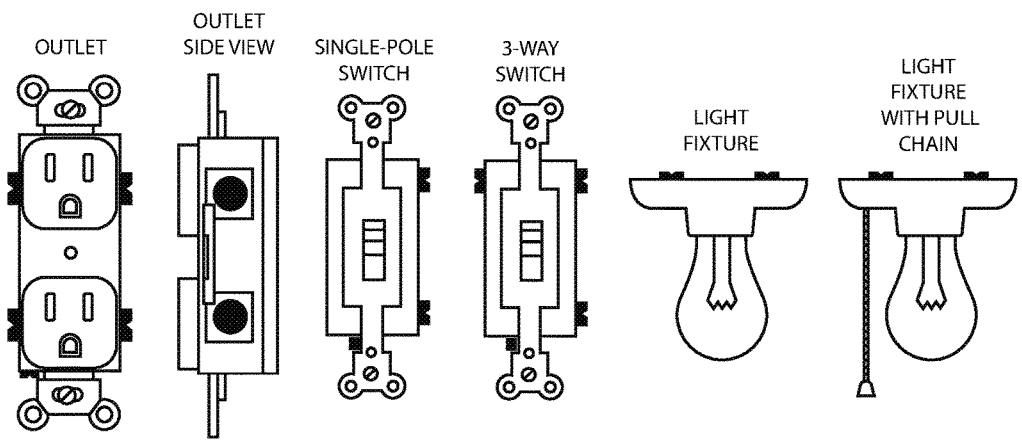

Diagram Legend

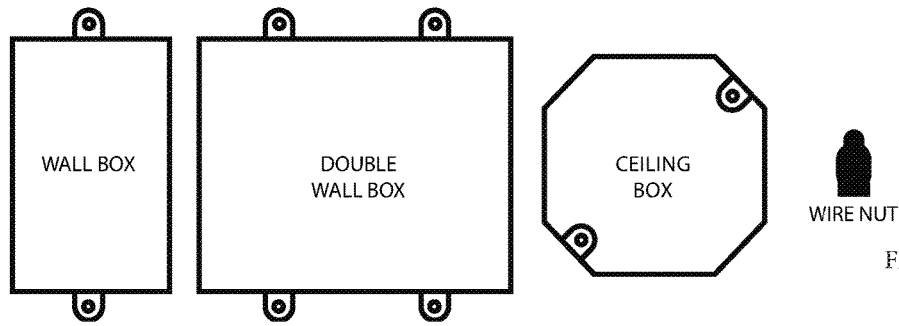

FIGURE 16B

Exercise Three – Single-Pole Switch Controlling One Light

Exercise Four – Single-Pole Switch Controlling Two Lights

Exercise Five – Two Single-Pole Switches Controlling Two Lights

Exercise Six – Outlet, Light with a Pull Chain – Power Through Outlet

Exercise Seven – Single-Pole Switch, Light, and Outlet using 14-3

Exercise Eight – Switch in a Double Gang Box with a Light in Another Box, Power from Light

Exercise Nine – 3-Way Switches with a Light

Exercise Ten – 3-Way Switches with a Light, Power through Light

Exercise Eleven – 3-Way Switches with a Light, Power Entry through both Switches First

Exercise Twelve – 3-Way Switches with a Light, with Power Entry through Light First then Switches in Series

Enhancement Exercise One – Two Single-Pole Switches with Two Lights, with Power Entry through a Light

Enhancement Exercise Two – 3-Way Switches with Two Lights, with Power Entry Through Switches

Enhancement Exercise Three – Single-Pole Switch with Two Lights and Two Outlets, Power through Switch

Enhancement Exercise Four – Split-Circuit Outlet

ELECTRICAL WIRING TRAINING KIT AND METHOD OF TRAINING

BACKGROUND

Electrical wiring skills are taught in many secondary schools around the world, both for career preparation as well as part of home maintenance skill development. There are many challenges with teaching this hands on skill to students (whether youth or other electrical novices), including a specialized knowledgebase, physical dangers involving commonly used AC voltages, difficulty in safely energizing student wiring projects for testing and assessment, and the amount of valuable class time consumed by evaluating student wiring projects.

Many simple wiring tasks do not require in depth understanding of the engineering principles that make the power grid, residential distribution systems, and how appliances work. However, even simple tasks require practical skills such as stripping wire, differentiating between hot, neutral, and ground wires, and troubleshooting.

Working with electricity can be dangerous, especially among novices. Novice electricians are prone to mistakes such as shorts, opens, and incorrectly wired switches, outlets, and sockets that can lead to arcing, high current draws, improper grounds, and other safety hazards. Safety concerns have led to many high school level programs discontinuing their electrical wiring training programs or failing to offer this training in the first place.

A further challenge with regards to electrical wiring training is the assessment process. Energizing a student wiring project safely requires a sound understanding of electricity and circuit protection devices. Improper powering of student projects could result in injury or tripping of school circuit breakers affecting other students and classes. Instructors also need to assess the correctness of the wiring. This is typically done by visually inspecting all of the wires and connections within the circuit, which can take a significant amount of time when multiplied by a large class size. Instructors may try to rely on off-the-shelf outlet testers. However, these tools only provide limited feedback on a fraction of the potential faults in an outlet circuit, and corresponding light socket testers do not exist.

Accordingly, a substantial need exists for a training and education system and method for safely and efficiently testing and assessing electrical wiring skills.

BRIEF DESCRIPTION OF THE DRAWINGS

FIGS. 13A-F are electrical schematics of one embodiment of the electrical components and electrical interconnections of the electrical wiring assessment kit of FIG. 1.

FIGS. 16A-K are pages of an exemplary student wiring exercise booklet capable of being performed and assessed using the student wiring project kit of FIG. 9 and the electrical wiring assessment kit of FIG. 1.

DETAILED DESCRIPTION OF A PREFERRED EMBODIMENT

Nomenclature Table

Figure 1:
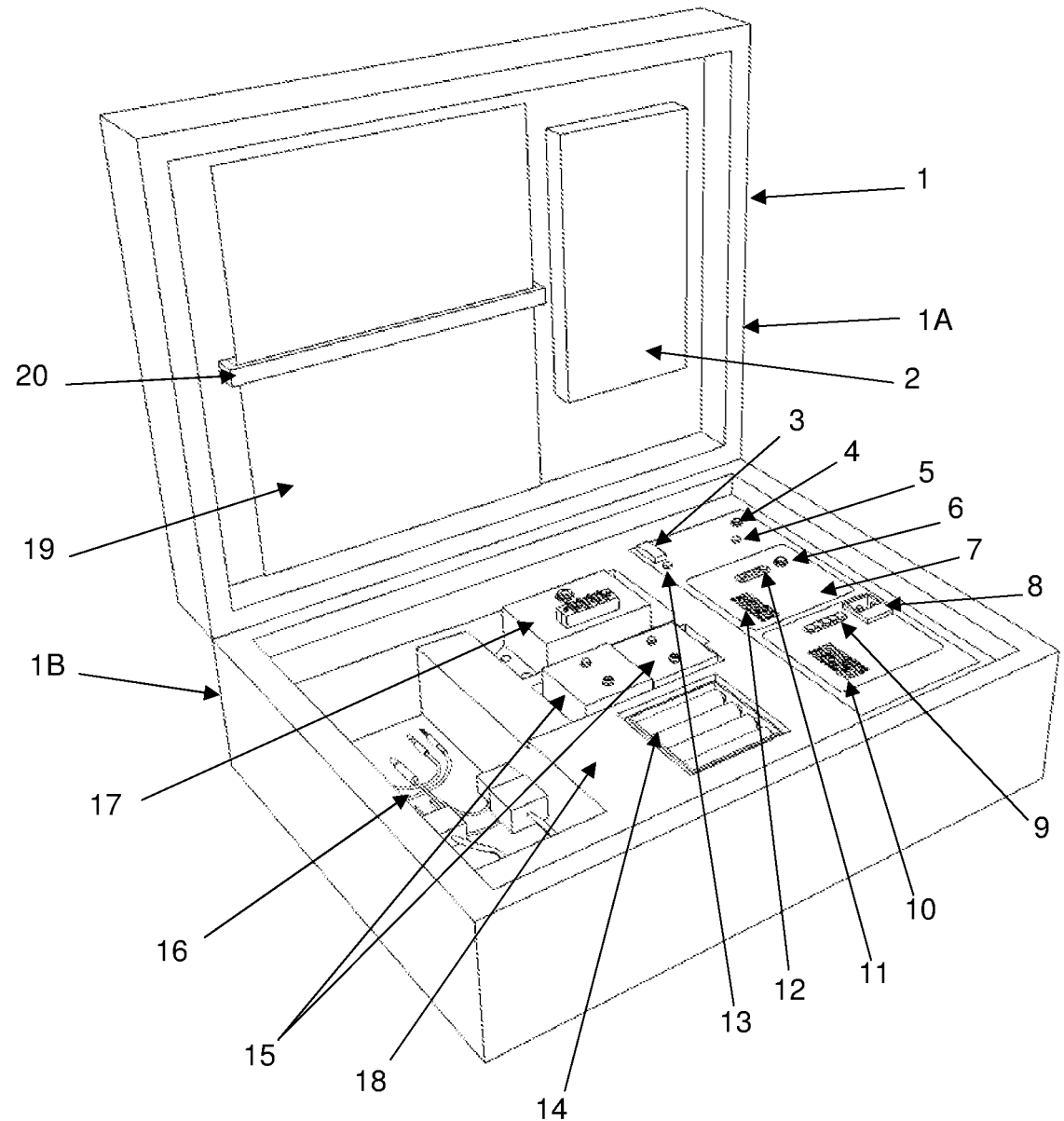
FIG. 1 is a perspective view of one embodiment of an electrical wiring assessment kit in accordance with the invention.

| REFERENCE NO. | NAME |
|---|---|
| 1 | Assessment Kit |
| 1A | Top Half of Case |
| 1B | Bottom Half of Case |
| 2 | Upper Insert |
| 3 | On/Off Switch |
| 4 | Breakout Box Power Connector |
| 5 | Breakout Box Power Indicator |
| 6 | Light Socket Test Connector |
| 7 | Assessment Kit Label |
| 8 | Outlet Test Connector |
| 9 | Outlet Test Indicator |
| 10 | Outlet Test Indicator Key |
| 11 | Light Socket Test Indicator |
| 12 | Light Socket Test Indicator Key |
| 13 | On/Off Indicator |
| 14 | Batteries |
| 15 | Light Socket Tester |
| 16 | Cable Storage Compartment |
| 17 | Breakout Box |
| 18 | Lower Insert |
| 19 | Curriculum |
| 20 | Flexible Strap |
| 22 | On/Off Switch Cutout |

Nomenclature Table

| REFERENCE NO. | NAME |
|---|---|
| 23 | On/Off Switch Label |
| 24 | On/Off Indicator Cutout |
| 25 | Light Socket Test Indicator Cutout |
| 26 | Light Socket Test Indicator Key Label |
| 27 | Outlet Test Indicator Cutout |
| 28 | Outlet Test Indicator Key Label |
| 29 | Outlet Test Connector Label |
| 30 | Outlet Test Connector Cutout |
| 31 | Light Socket Test Connector Label |
| 32 | Light Socket Test Connector Cutout |
| 33 | Breakout Box Power Indicator Cutout |
| 34 | Breakout Box Power Indicator Label |
| 35 | Breakout Box Power Connector Label |
| 36 | Breakout Box Power Connector Cutout |
| 40 | Wall Panel Frame |
| 41 | Unpopulated Ceiling Box |
| 42 | Populated Ceiling Box |
| 43 | Unpopulated Double Gang Box |
| 44 | Unpopulated Single Gang Box |
| 45 | Populated Single Gang Box |
| 46 | Unpopulated Single Gang Box |
| 47 | Breakout Box |
| 48A | Wood Vertical Stud |
| 48B | Wood Vertical Stud |
| 49 | Wood Horizontal Spar |
| 50 | First Barrel Plug |
| 51 | Flexible Two Conductor Cable |
| 52 | Second Barrel Plug |
| 60 | Flexible Three Conductor Cable |
| 61 | NEMA 5 Outlet Plug |
| 62 | IEC Male Plug |
| 70 | First 3.5 mm Round Plug |
| 71 | Second 3.5 mm Round Plug |
| 72 | Flexible Three Conductor Cable |
| 80 | Wall Panel |
| 81 | 2 conductor electrical wire |
| 82 | 3 conductor electrical wire |
| 83 | Wire nuts |
| 84 | 15 amp outlet |
| 85 | Three way switch |
| 86 | Single pole switch |
| 87 | Electrical Tape |
| 88 | Ceramic Light Socket with pull chain |
| 89 | Ceramic Light Socket |
| 90 | Breakout Box Enclosure |
| 91 | Ground Screw Terminal |
| 92 | Neutral Screw Terminal |
| 93 | Hot Screw Terminal |
| 94 | Mounting Hole |
| 95 | Mounting Flange |
| 96 | Input Power Connector |
| 97 | Mounting Flange |
| 100 | Light Socket Connector |
| 101 | Light Socket Tester Enclosure |
| 102 | Light Socket Test Cable Connector |
| 103 | Light Socket Tester Indicator LED |
| 200 | Batteries |
| 201 | System Voltage Regulator |
| 202 | Hot Voltage Regulator |
| 203 | Neutral Voltage Regulator |
| 204 | Ground Voltage Regulator |
| 205 | Hot Protection Circuit |
| 206 | Neutral Protection Circuit |
| 207 | Ground Protection Circuit |
| 208 | Breakout Box Power Connector |
| 209 | Microcontroller |
| 210 | Outlet Signal Conditioning Circuit |
| 211 | Outlet Protection Circuit |
| 212 | Outlet Test Connector |
| 213 | Socket Signal Conditioning Circuit |
| 214 | Socket Protection Circuit |
| 215 | Socket Test Connector |
| 216 | Outlet Indicator Array |
| 217 | Socket Indicator Array |

Construction

Referring to FIG. 1, the components of the assessment kit 1 can be retained within a rotomolded plastic case with a top half 1A and a bottom half 1B. An upper insert 2 made from thermoformed plastic can be installed in the top half of the case to hold a curriculum 19, held firmly in place during storage by a flexible strap 20. The curriculum 19 can contain instructions on possible projects that a student can complete to exercise and demonstrate their wiring skills. A thermoformed lower insert 18 can be installed in the bottom half 1B to hold the remaining components of the assessment kit 1.

An on/off switch 3 functions to connect the batteries 14 to the internal electronics when in the on position, and to disconnect the batteries 14 from the internal electronics when in the off position and not in use. When the on/off switch 3 is in the on position and the batteries 14 are present and charged, the on/off indicator 13 will illuminate.

Figure 8:
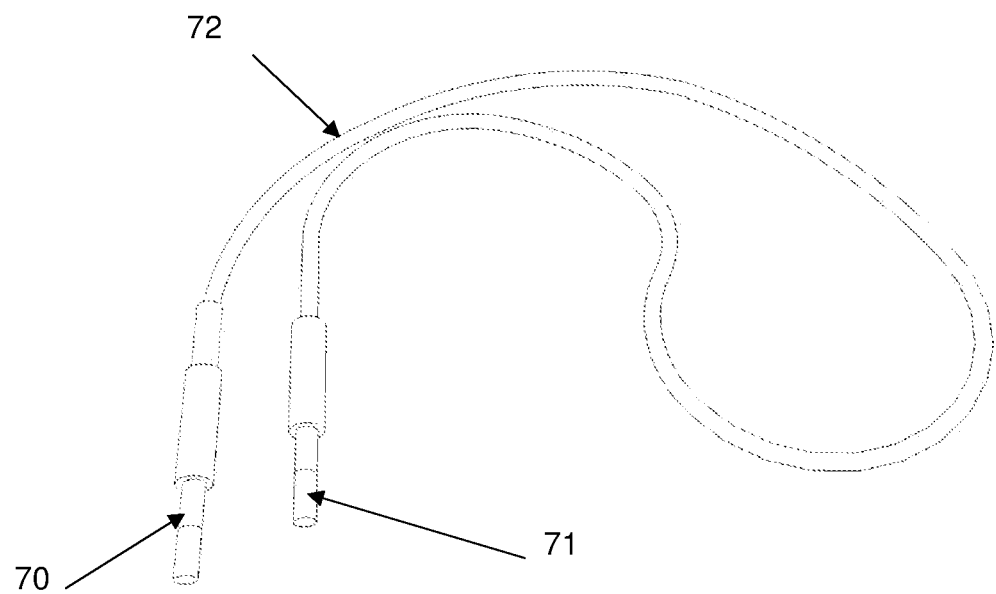
FIG. 8 is an enlarged perspective view of the breakout box power cable component of the electrical wiring assessment kit of FIG. 1.

The assessment kit includes a breakout box 17 which acts as an electrical connection point for student wiring projects and is further described in FIG. 8. When the internal electronics are powered, the internal electronics energizes contacts on the breakout box power connector 4, which can be used to energize a student wiring project. A breakout box power indicator 5 illuminates when electrical power is being delivered to all of these contacts, and is not illuminated when electrical power is not being delivered to all of these contacts.

The assessment kit 1 also includes at least one light socket tester 15, which can be installed in a standard light socket to enable testing during use.

A light socket test connector 6 serves as a connection point to electrically connect the internal assessment circuit to a light socket tester 15 during use. Feedback on correctness of light socket wiring is displayed on a light socket test indicator 11 which in this embodiment is an array of LEDs. A light socket test indicator key 12 that describes what pattern of LEDs corresponds to which correct or incorrect wiring configuration is printed on an assessment kit label 7, which can be adhesively attached to the lower insert 18.

An outlet test connector 8 serves as a connection point to electrically connect the internal assessment circuit to an outlet in the student wiring project during use. Feedback on correctness of outlet wiring is displayed on an outlet test indicator 9 which in this embodiment is an array of LEDs. An outlet test indicator key 10 that describes what pattern of LEDs corresponds to which correct or incorrect wiring configuration is printed on an assessment kit label 7, which can be adhesively attached to the lower insert 18.

A cable storage compartment 16 is preferably provided for storing cables used to electrically connect the assessment kit to the student wiring project.

Figure 2:
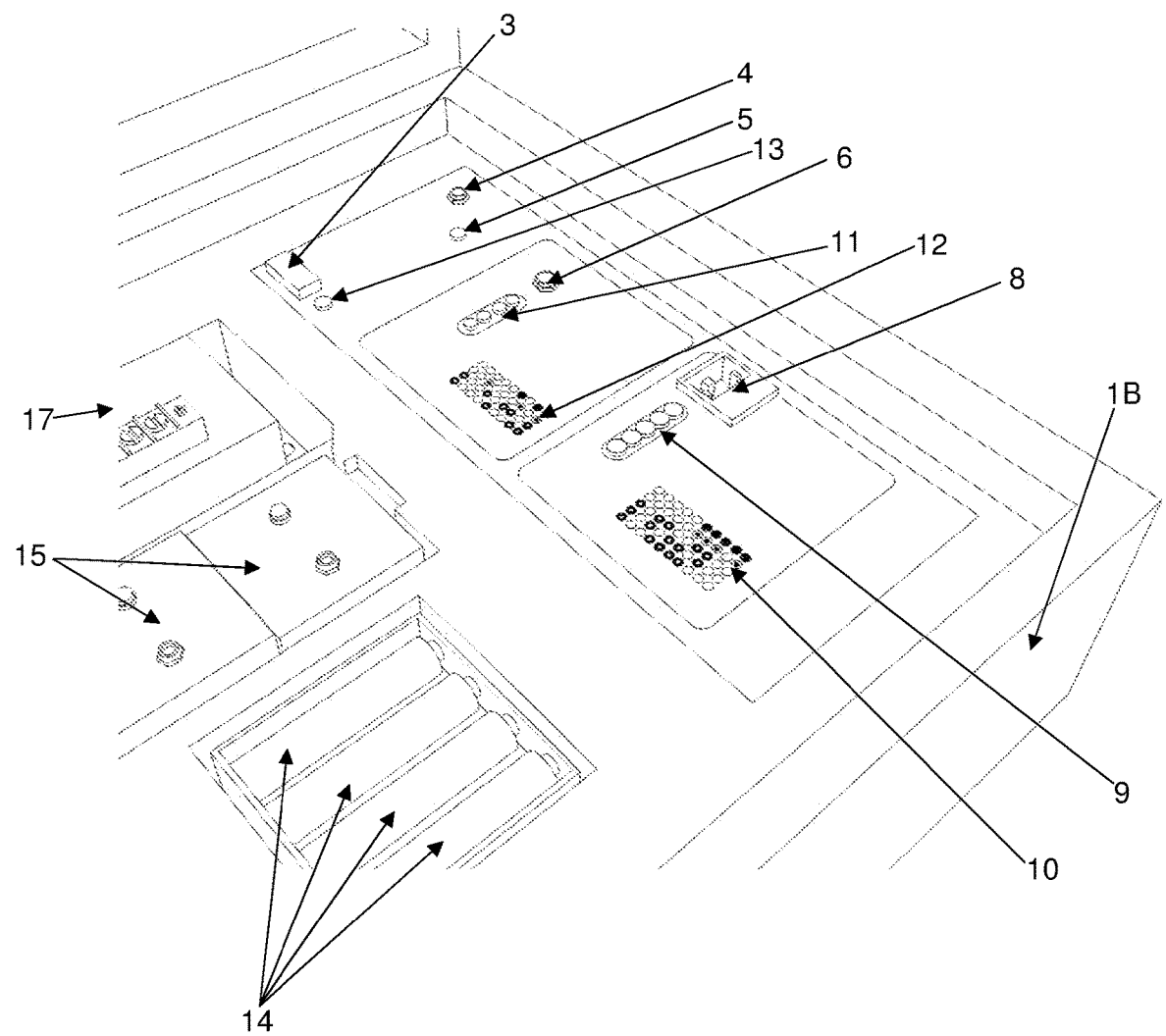
FIG. 2 is an enlarged perspective view of the assessment circuit component of the electrical wiring assessment kit of FIG. 1 including one embodiment of reporting light bars on the assessment circuit and a depiction of one embodiment of a legend listing and explaining the meaning of various reported light bar patterns.
Figure 3:
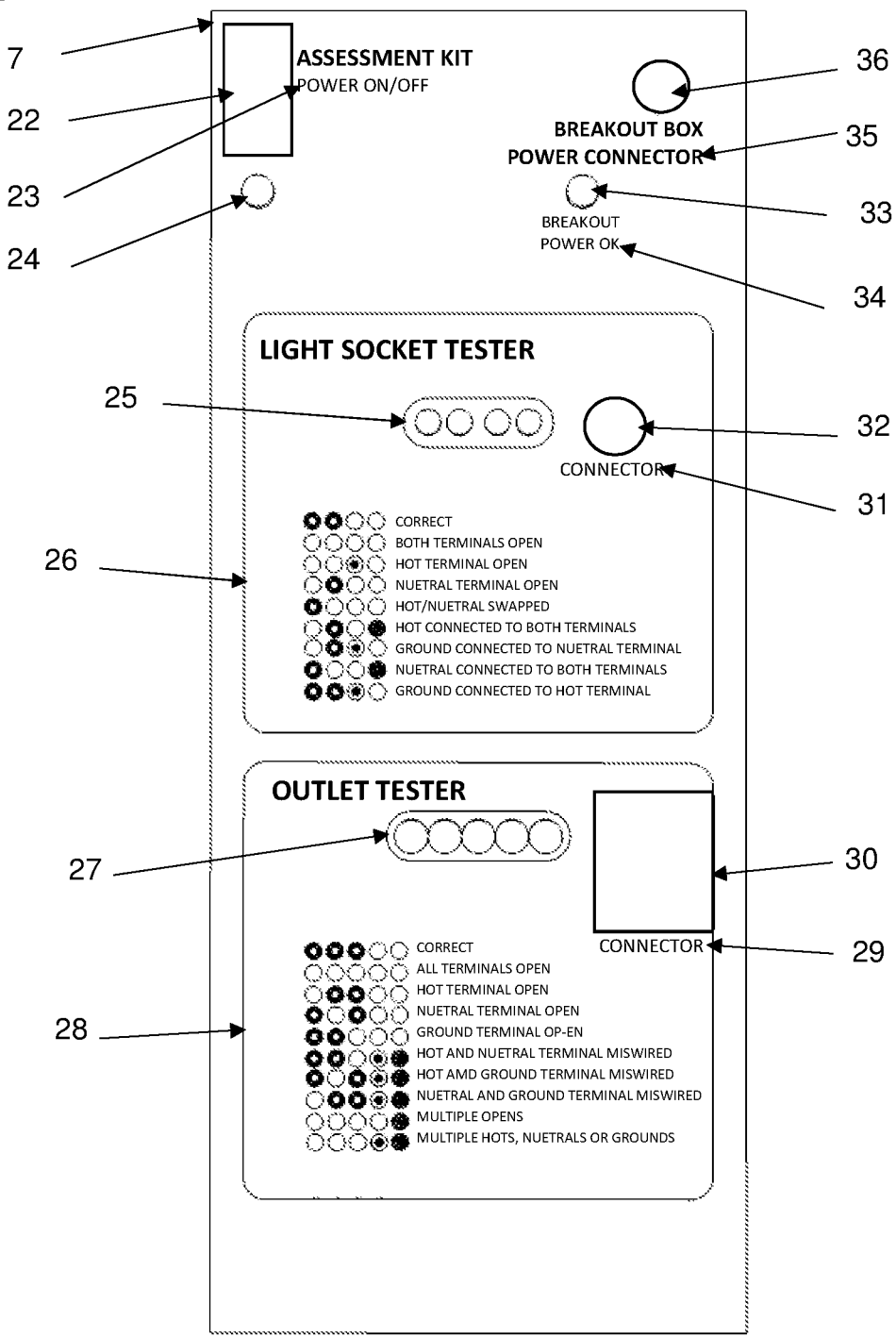
FIG. 3 is a top view of the indicia bearing label on the face of the assessment circuit depicted in FIG. 2.

Referring to FIGS. 1, 2 and 3, the assessment kit preferably includes a multi-color adhesive backed label that is permanently attached to the lower insert of the assessment kit for labeling the various switches, connections and displays on the kit.

An on/off switch cutout 22 in the label provides a gap through which the on/off switch can be inserted into the lower insert. The on/off switch in the preferred embodiment is a rocker switch. The on/off switch label 23 describing the function of this switch is located proximate to the switch. An on/off indicator cutout 24 provides a gap through which the on/off indicator can be viewed.

A light socket test indicator cutout 25 in the label provides a gap through which the light socket test indicator 11 can be seen. Proximate to this cutout is a light socket test indicator key label 26 which consists of circles representing LEDs and text describing the correctness of the light socket wiring. The LEDs are preferably color coded. A light socket test connector label 31 identifies the function of the connector located in the light socket test connector cutout 32.

An outlet test indicator cutout 27 in the label provides a gap through which the outlet test indicator 9 can be seen. Proximate to this cutout is an outlet test indicator key label 28 which consists of circles representing LEDs and text describing the correctness of the outlet wiring. These LEDs are preferably color coded. An outlet test connector label 29 identifies the function of the connector located in the outlet test connector cutout 30.

A breakout box power indicator cutout 33 provides a gap through which the breakout box power indicator can be viewed. Proximate to this cutout is a breakout box power indicator label 34 which describes the function of this indicator. A breakout box power connector label 35 identifies the function of the connector located in the breakout box power connector cutout 36.

Figure 4:
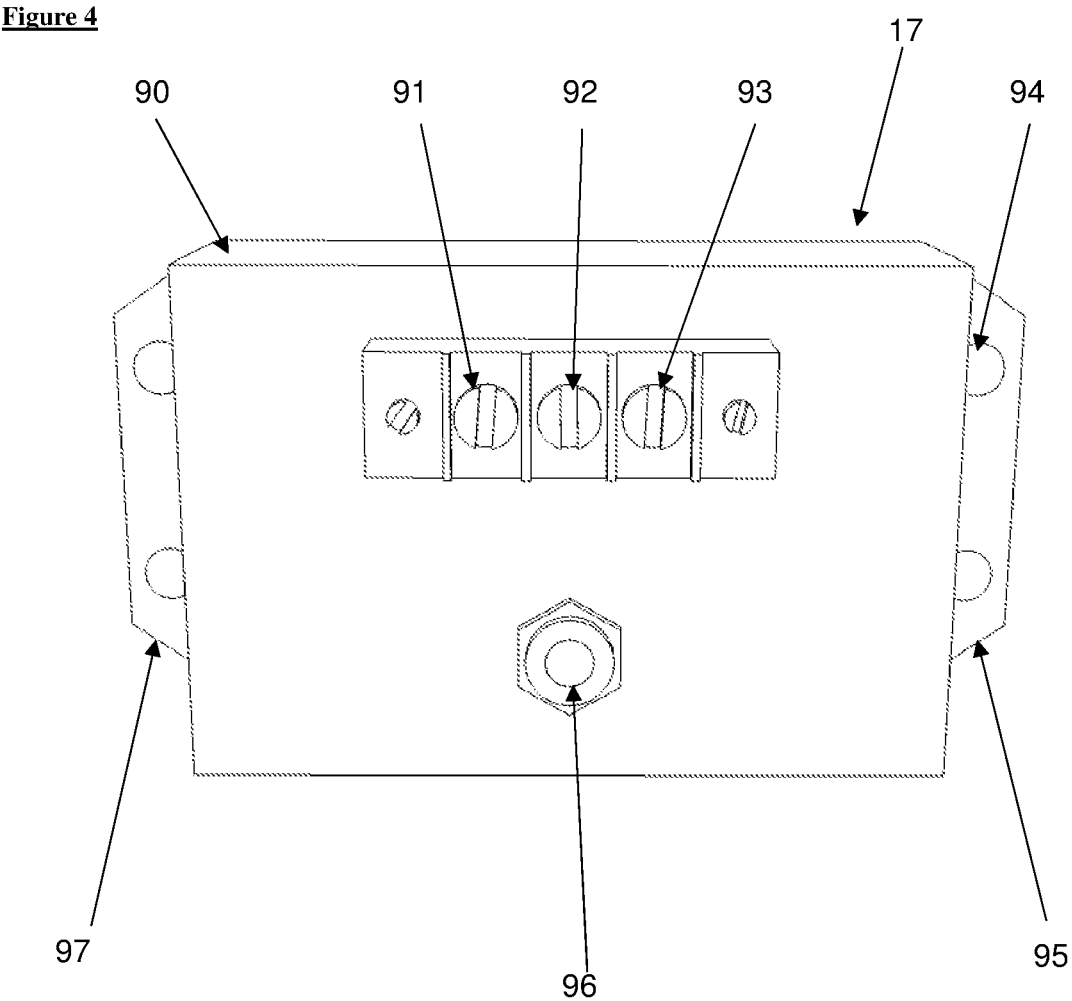
FIG. 4 is an enlarged front view of the breakout box component of the electrical wiring assessment kit of FIG. 1.

Referring to FIG. 4, the assessment kit 1 includes a breakout box 17. The breakout box 17 is housed in a non-conductive plastic enclosure 90. This box has two mounting flanges 95 and 97, with one or more mounting holes 94, which can be used to attach the breakout box to the wall panel 80 of a student wiring project or any other structure. Power is brought to the breakout box through the input power connector 96. It is distributed to three screw terminals—the Ground Screw Terminal 91, Neutral Screw Terminal 92, and Hot Screw Terminal 93. The breakout box serves to receive voltages for the hot, neutral, and ground signals, and provide a means for the student to access these signals for wiring up their projects.

Figure 5:
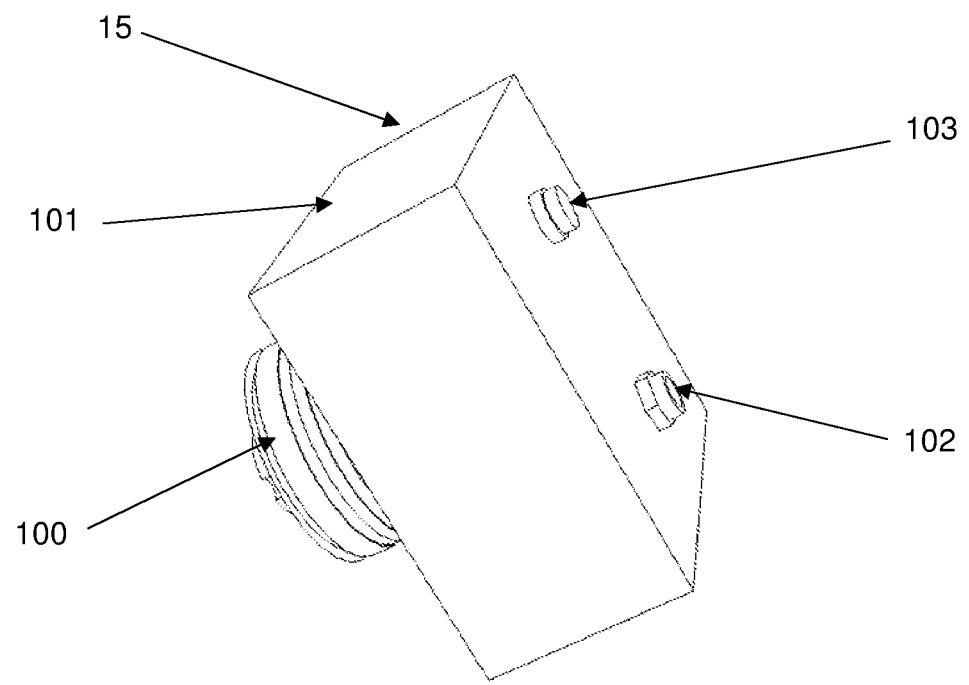
FIG. 5 is an enlarged perspective view of the socket test adapter component of the electrical wiring assessment kit of FIG. 1.

Referring to FIG. 5, the assessment kit 1 includes a light socket tester 15. The light socket tester 15 is housed in a non-conductive plastic enclosure 101. Extending from one face is a light socket connector 100 which fits a standard light socket. On the opposite face is a light socket test cable connector 102 and a light socket tester indicator LED 103. The hot and neutral connections on the light socket connector 100 are electrically connected to the light socket test cable connector 102 to facilitate transfer of these signals back to the assessment kit electronics. The light socket tester indicator LED 103 is electrically connected to the hot and neutral connections on the light socket connector 100 such that it will illuminate if the signals on the hot and neutral connections would illuminate a standard light bulb.

Figure 6:
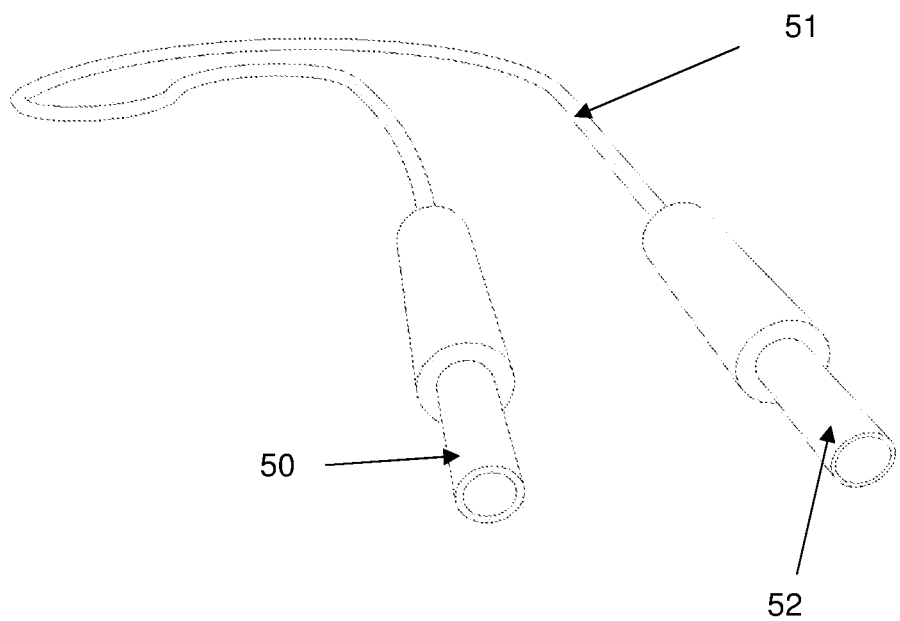
FIG. 6 is an enlarged perspective view of the socket testing cable component of the electrical wiring assessment kit of FIG. 1.

Referring to FIG. 6, the assessment kit 1 includes a socket test cable for electrically connecting the electronics within the assessment kit to a student wiring project. The socket test cable includes a first barrel plug 50, a flexible two conductor cable 51, and a second barrel plug 52. The first and second barrel plugs are interchangeable, such that either can be used in either application. In use, a first barrel plug would be inserted into the light socket test connector 6. The second barrel plug 52 would be inserted into the test cable connector 102 of the socket tester, as found on FIG. 7. The flexible two conductor cable 51, a 6-foot length cable in the preferred embodiment, enables the assessment kit to be located next to a student wiring project. When not in use, this cable would be stored in the cable storage compartment 16 of the assessment kit.

Figure 7:
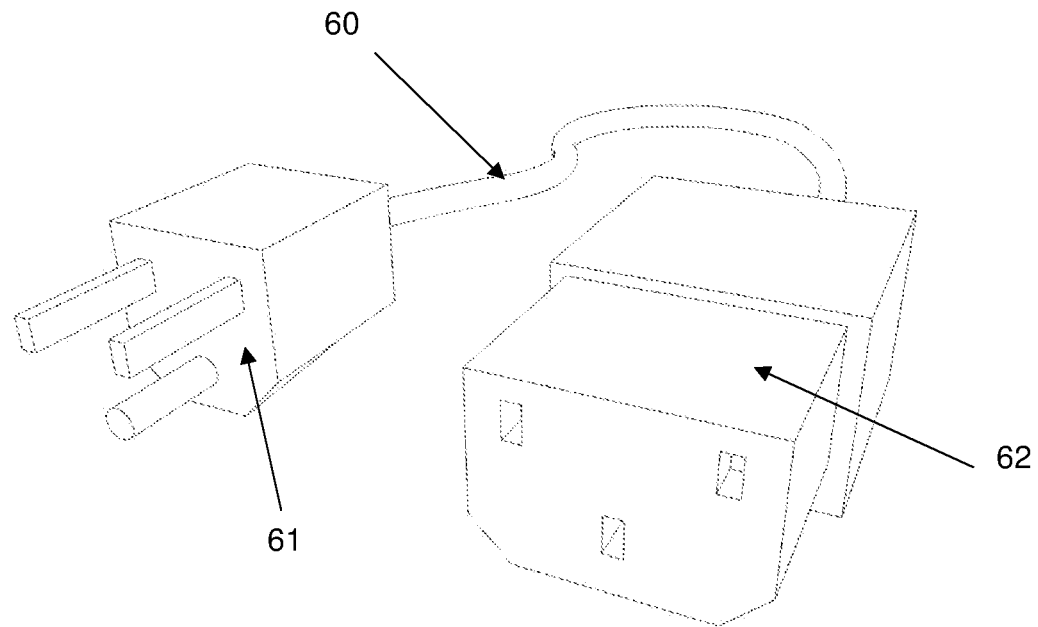
FIG. 7 is an enlarged perspective view of the outlet testing cable component of the electrical wiring assessment kit of FIG. 1.
Figure 11:
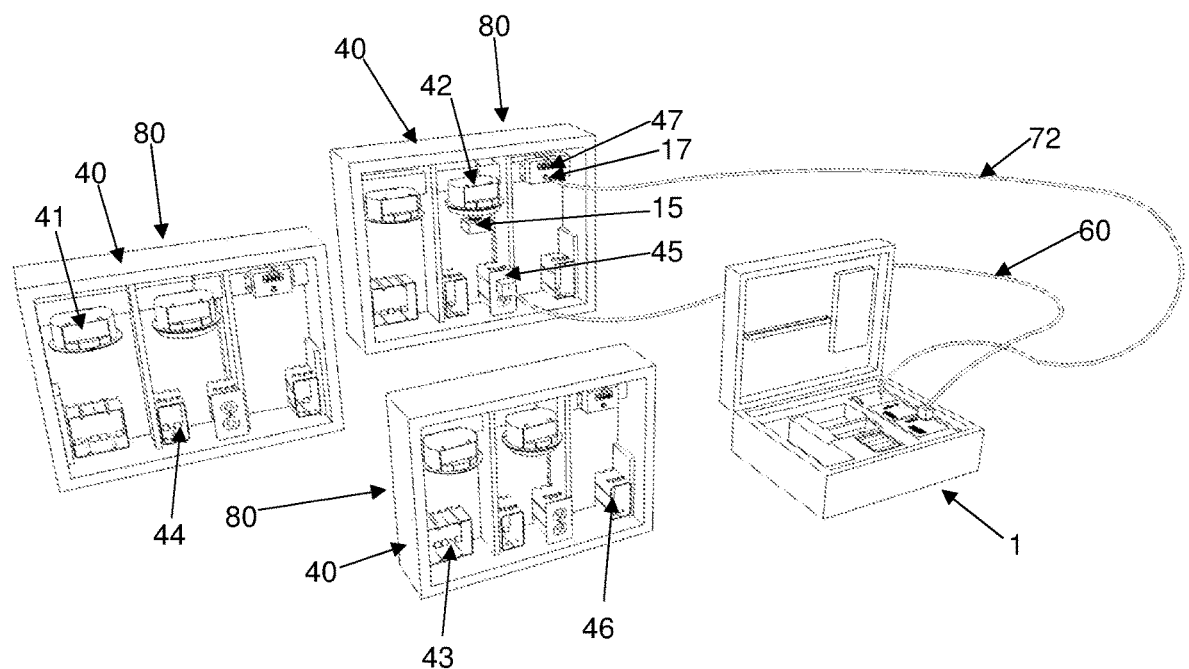
FIG. 11 is a schematic view of the electrical wiring assessment kit of FIG. 1 in electrical assessing communication with one of a plurality of wired student wiring project kits of FIG. 10.

Referring to FIGS. 7 and 11, the assessment kit 1 includes an outlet test cable for electrically connecting the electronics within the assessment kit to a student wiring project. The outlet test cable includes a flexible three conductor cable 60 with a NEMA 5 outlet plug 61 on one end and an IEC male plug 62 on the other. In use, the IEC male plug 62 would be inserted into the outlet test connector 8 on the assessment kit, and the NEMA 5 outlet plug would be inserted directly into an outlet on the student wiring project. The flexible three conductor cable 60, a 3.3-foot length cable in the preferred embodiment, enables the assessment kit to be located next to a student wiring project. When not in use, this cable would be stored in the cable storage compartment 16 of the assessment kit.

Referring to FIGS. 8 and 11, the assessment kit 1 includes a breakout box power cable for delivering electrical power from the assessment kit to a student wiring project. The breakout box power cable includes a first 3.5 mm round plug 70 joined to a second 3.5 mm round plug 71 by a flexible three conductor cable 72. The first and second 3.5 mm round plugs are interchangeable. In use, the first 3.5 mm round plug 70 would be inserted into the breakout box power connector 4 on the assessment kit. The second 3.5 mm round plug 71 would be inserted into the input power connector 96 of the breakout box as found in FIG. 8. The flexible three conductor cable 72, a 6-foot length cable in the preferred embodiment, enables the assessment kit to be located next to a student wiring project. When not in use, this cable would be stored in the cable storage compartment 16 of the assessment kit.

Figure 9:
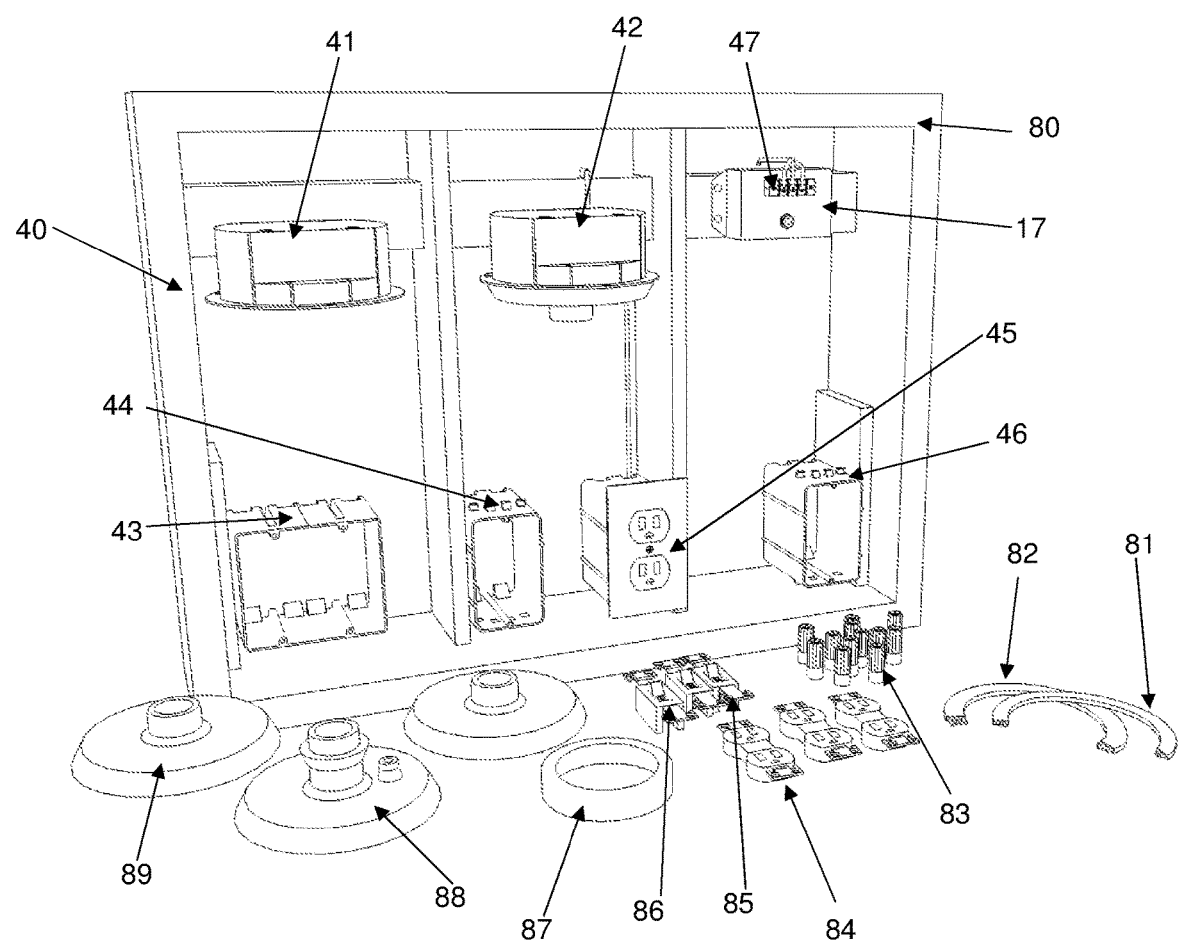
FIG. 9 is a perspective view of one embodiment of a partially assembled and wired student wiring project kit with a mounted breakout box component from the electrical wiring assessment kit of FIG. 1.
Figure 10:
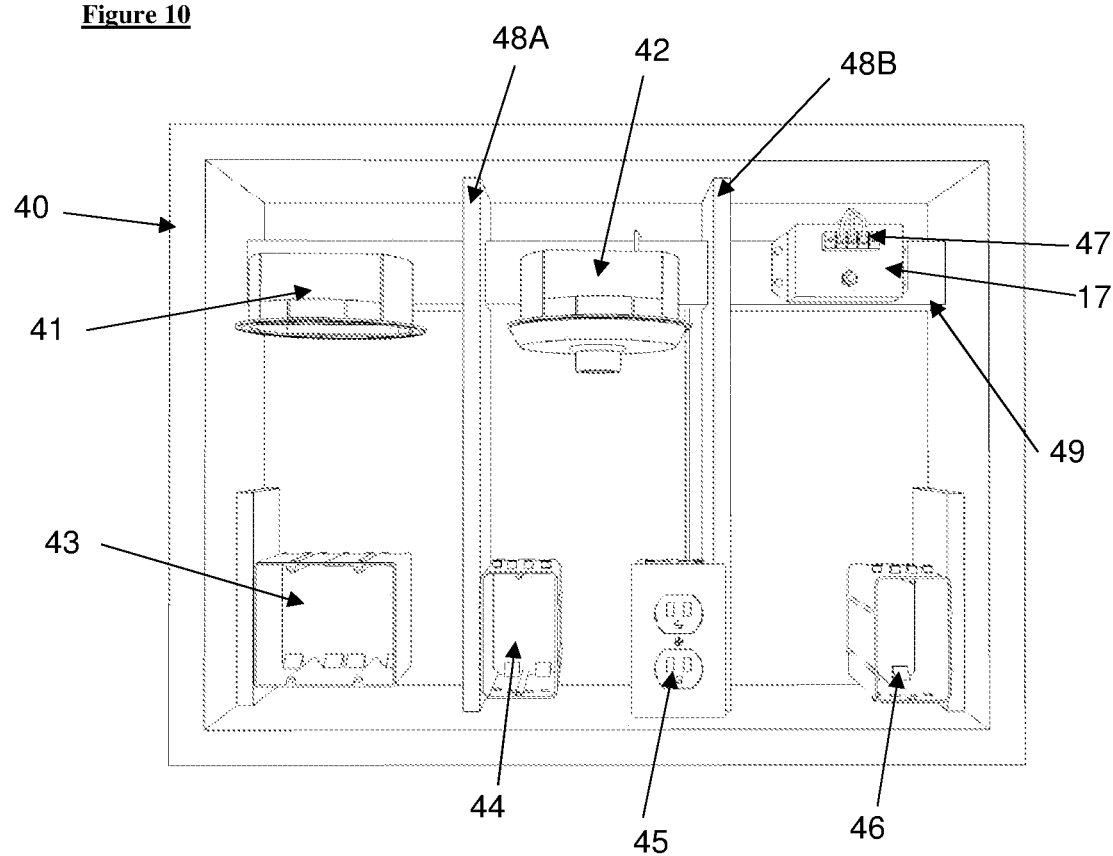
FIG. 10 is an enlarged front view of the partially assembled and wired portion of the student wiring project kit of FIG. 9.

Referring to FIGS. 9 and 10, an exemplary student wiring project is a wall panel section supported by a wall panel frame 40, electrical boxes mounted to the frame, and an accessory bundle that includes outlets, sockets, switches and lengths of cabling. A wood horizontal spar 49 and two wood vertical studs 48A and 48B create a representation of a wall section as commonly found in residential wooden construction, but in a form factor that can fit on a desk or table for classroom use. A selection of electrical boxes is attached to these wooden studs and spars to facilitate completion of a set of wiring exercises. The wall panel would be provided to a student with an accessory bundle that includes the items necessary to complete a set of exercises to practice and demonstrate basic wiring skills. These exercises could be provided to the student in curriculum 19 included within the assessment kit 1 such as depicted in FIG. 1.

Referring to FIG. 9, the accessory bundle could include wire for connecting fixtures such as 2-conductor wire 81 and 3-conductor wire 82, wire nuts 83, 15 amp outlets 84, three-way switches 85, single pole switches 86, electrical tape 87, ceramic light socket with pull chain 88, and ceramic light sockets 89.

Referring to FIGS. 9 and 10, the student wiring project depicted therein is partially assembled, with one of the ceiling boxes 42 populated with a commonly available round ceramic light socket, and one of the single gang boxes 45 populated with a commonly available 15 amp outlet. A breakout box 47 is also attached to the horizontal spar 49, serving as the starting point for the students in completing their wiring projects.

Figure 12:
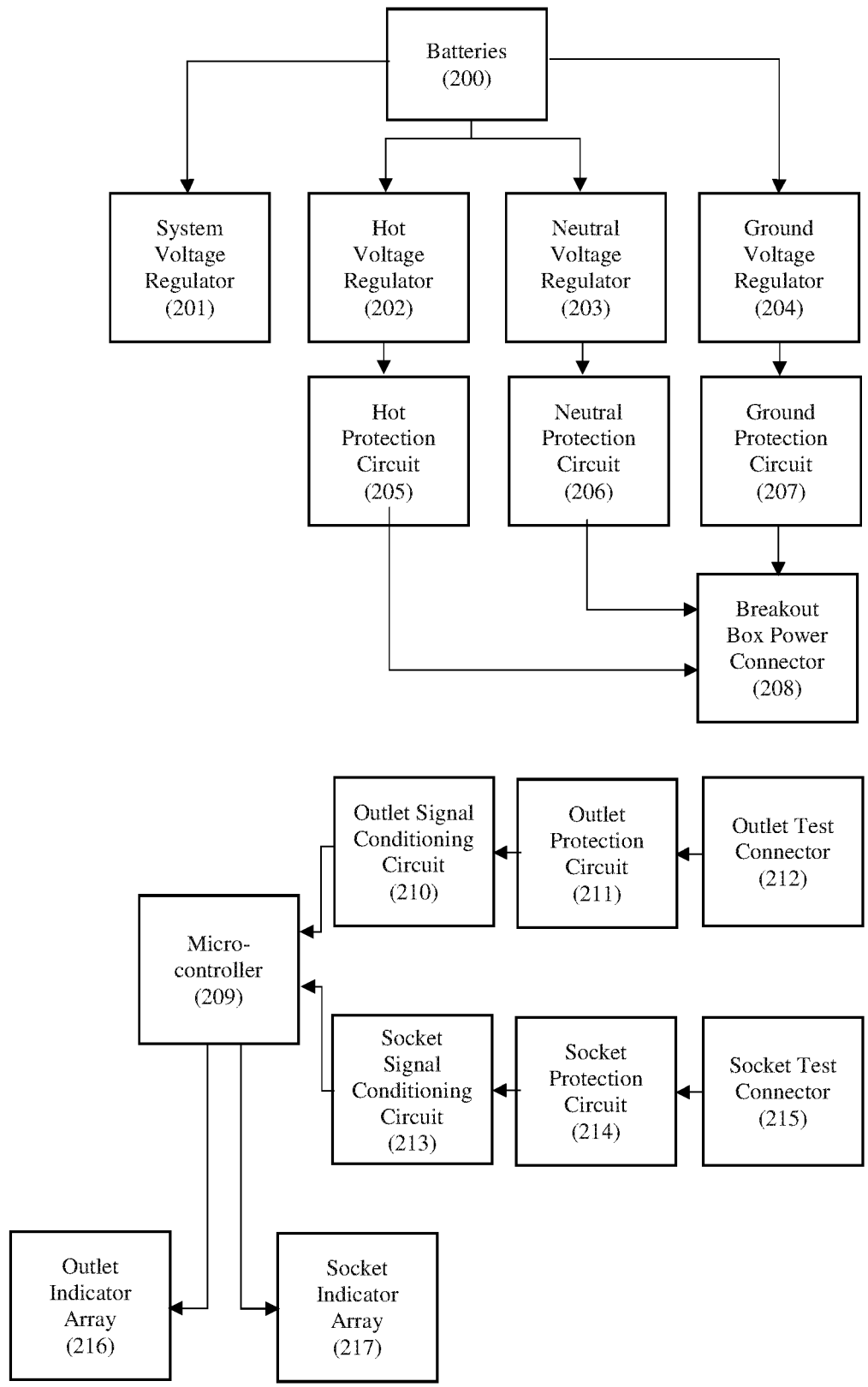
FIG. 12 is a schematic block diagram of one embodiment of the internal electronics of the electrical wiring assessment kit of FIG. 1.
Figure 13A:
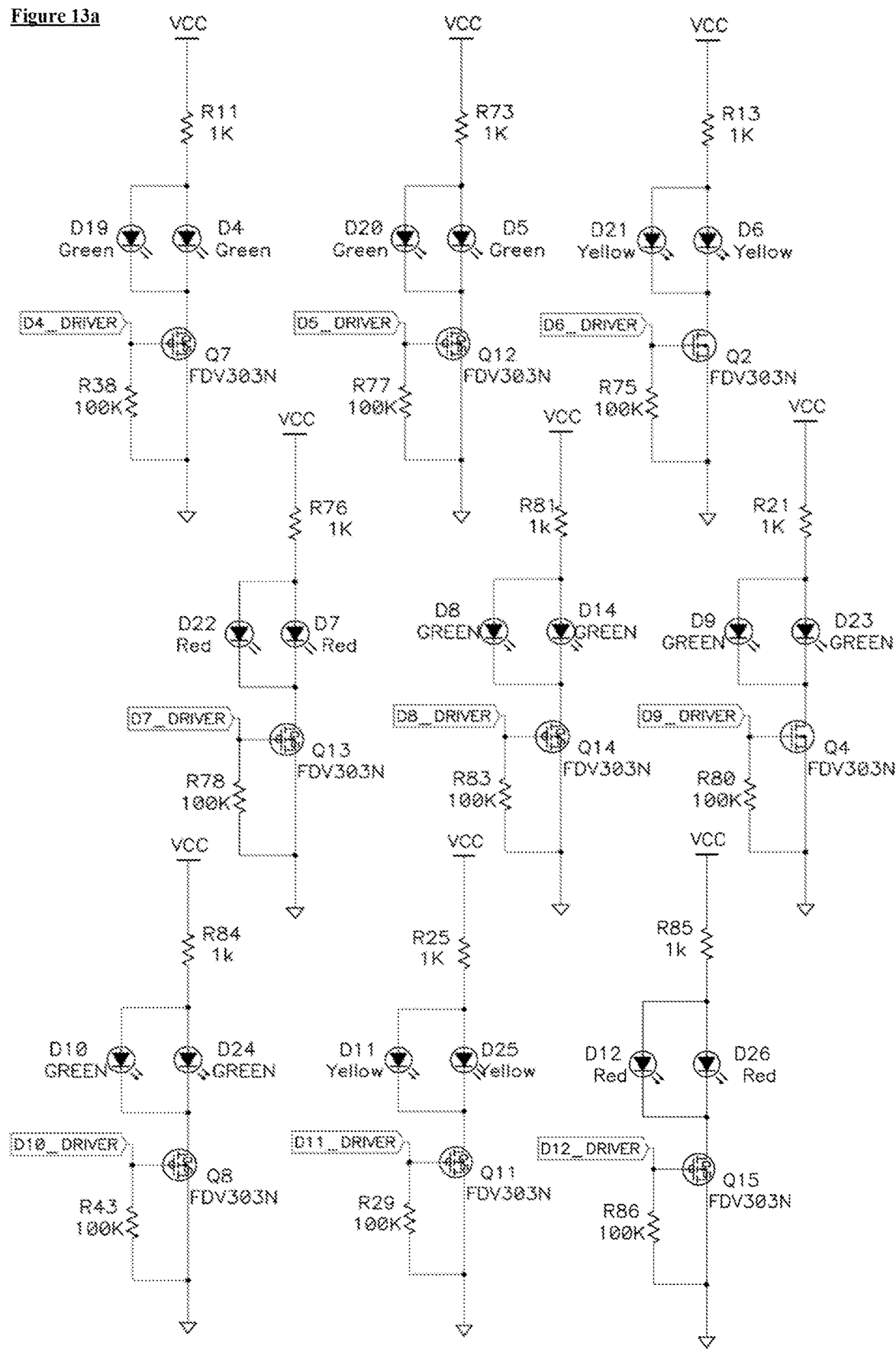
Figure 13B:
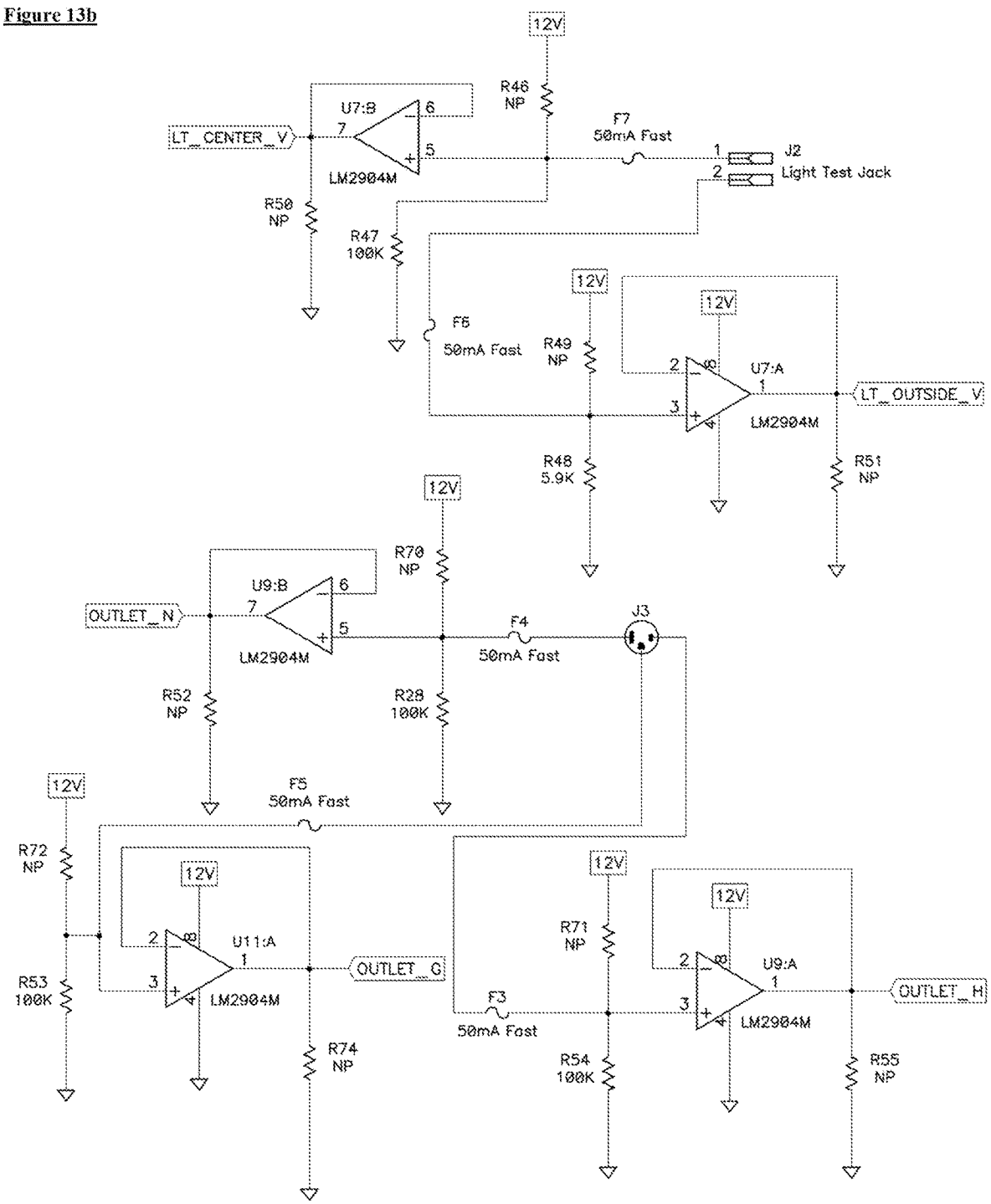
Figure 13C:
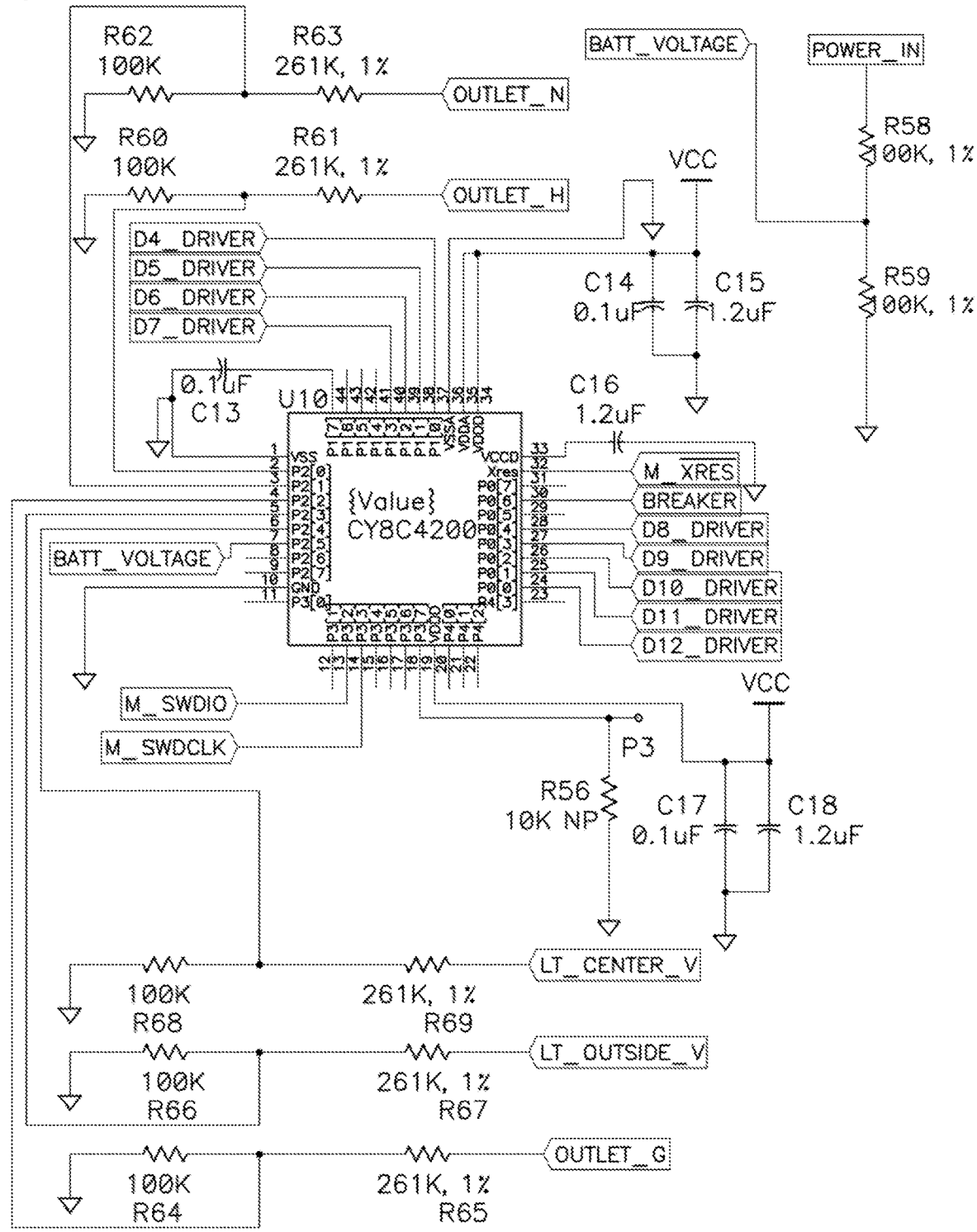
Figure 13D:
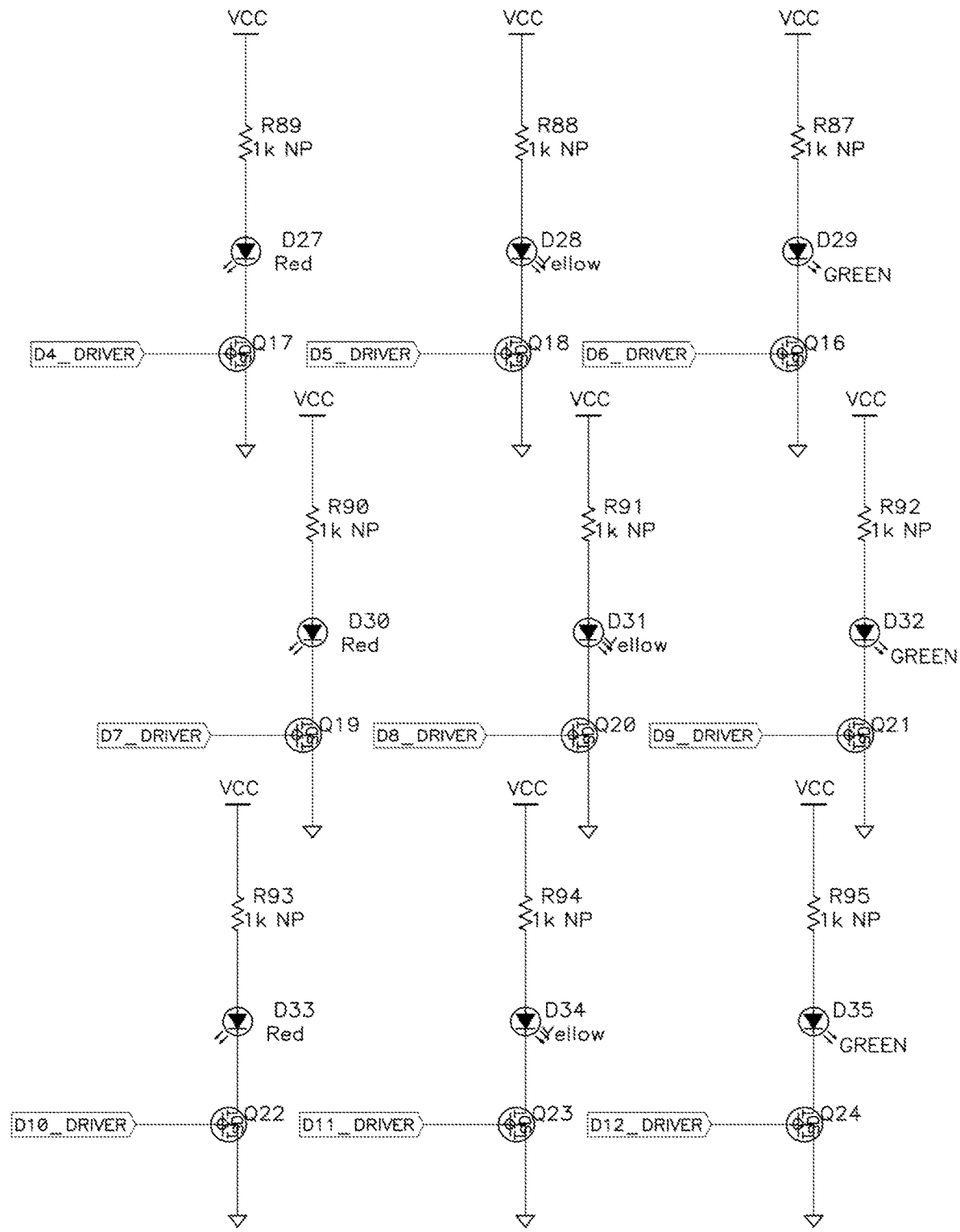
Figure 13F:
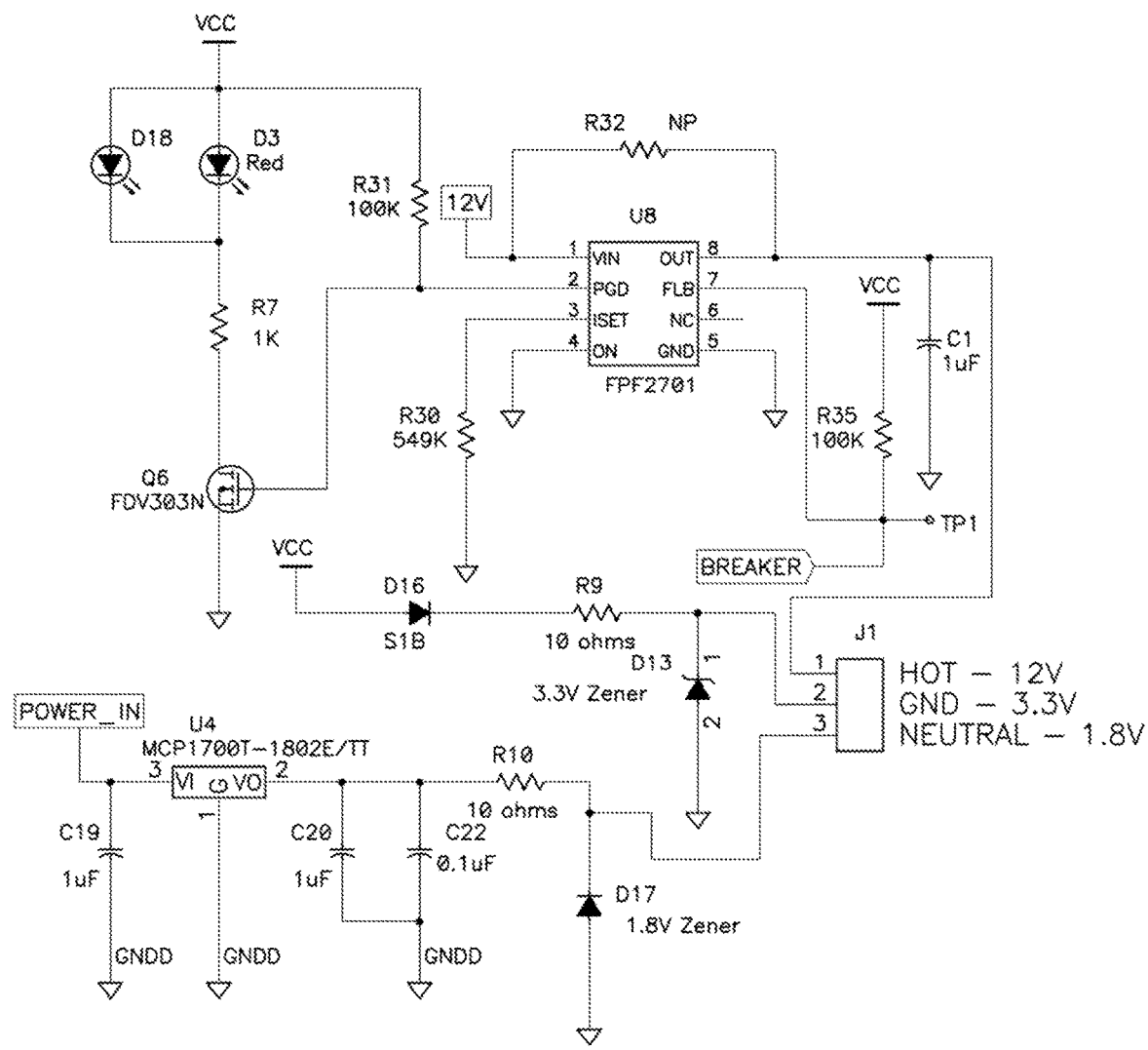
Figure 15:
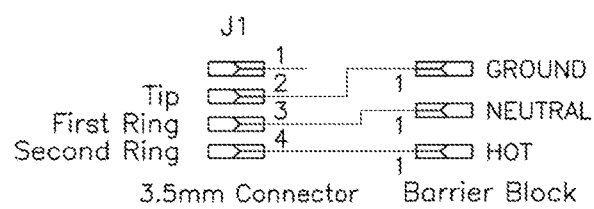
FIG. 15 is an electrical schematic of one embodiment of the components and interconnections of the breakout box component of the electrical wiring assessment kit of FIG. 1.
Figure 14:
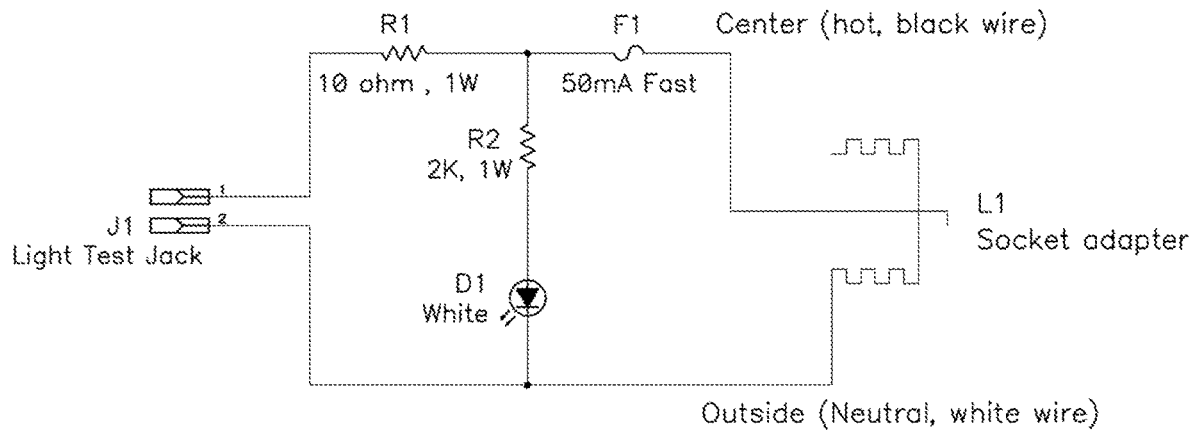
FIG. 14 is an electrical schematic of one embodiment of the components and interconnections of the socket test adapter component of the electrical wiring assessment kit of FIG. 1.
Figure 16C:
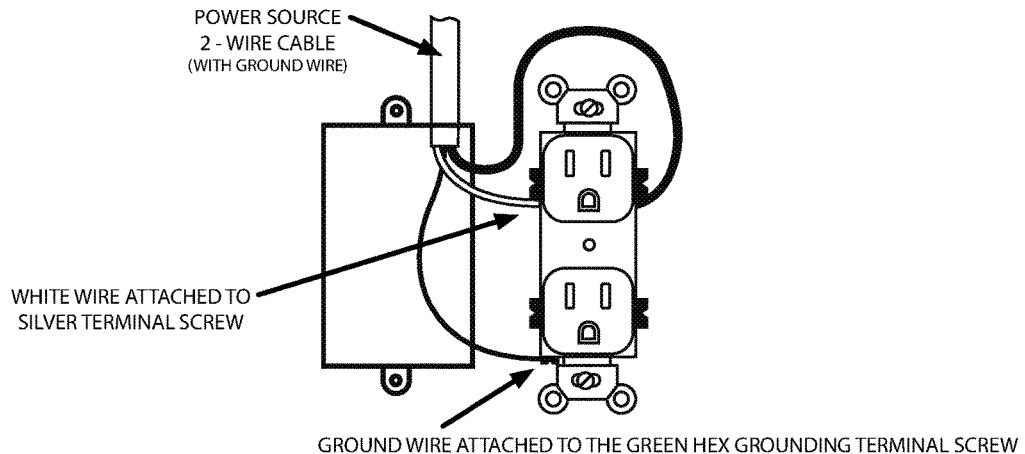
Figure 16C:
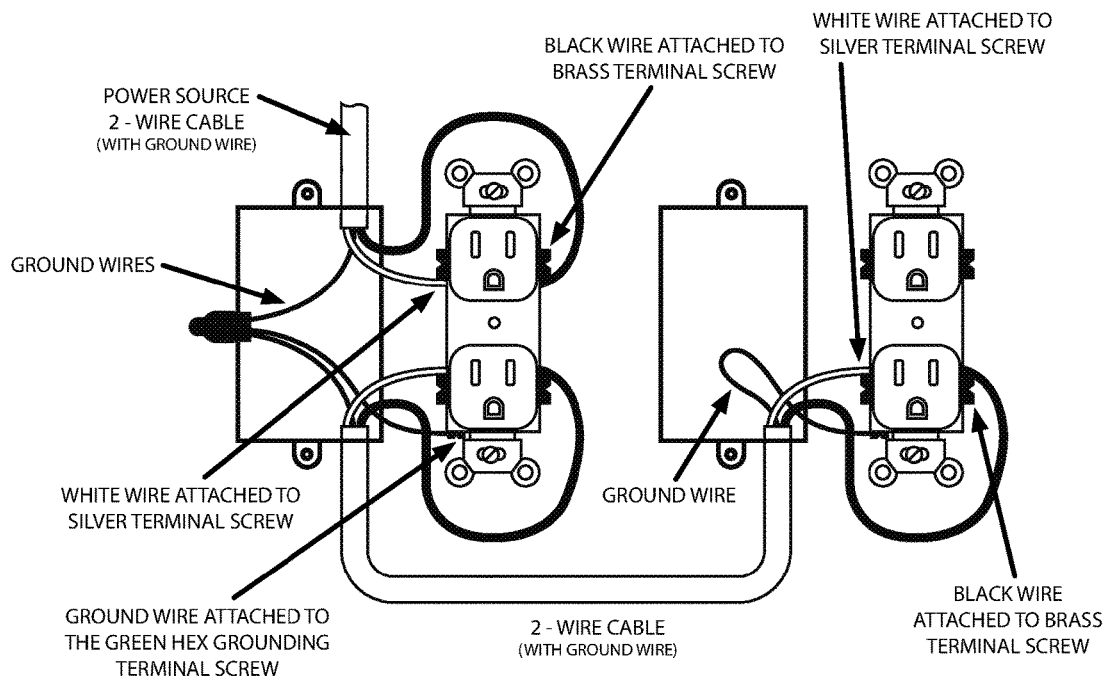
Figure 16D:
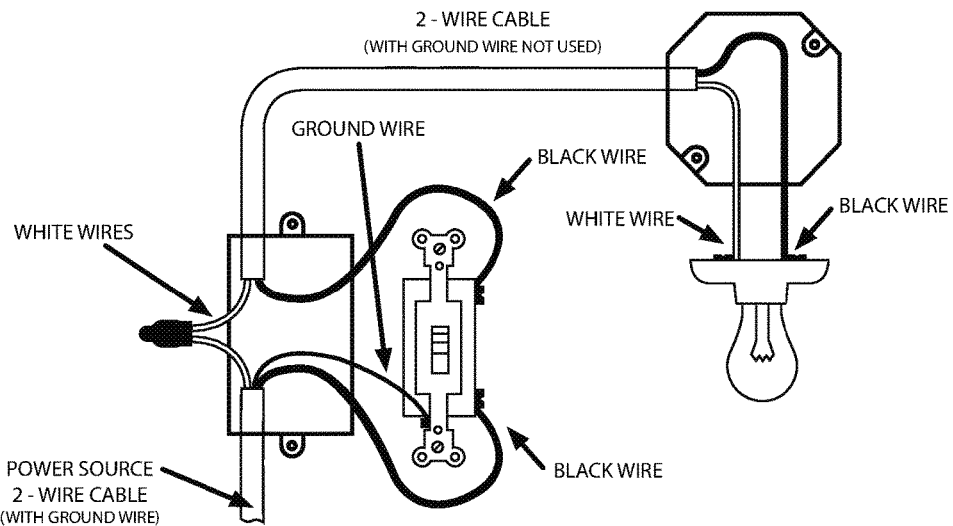
Figure 16D:
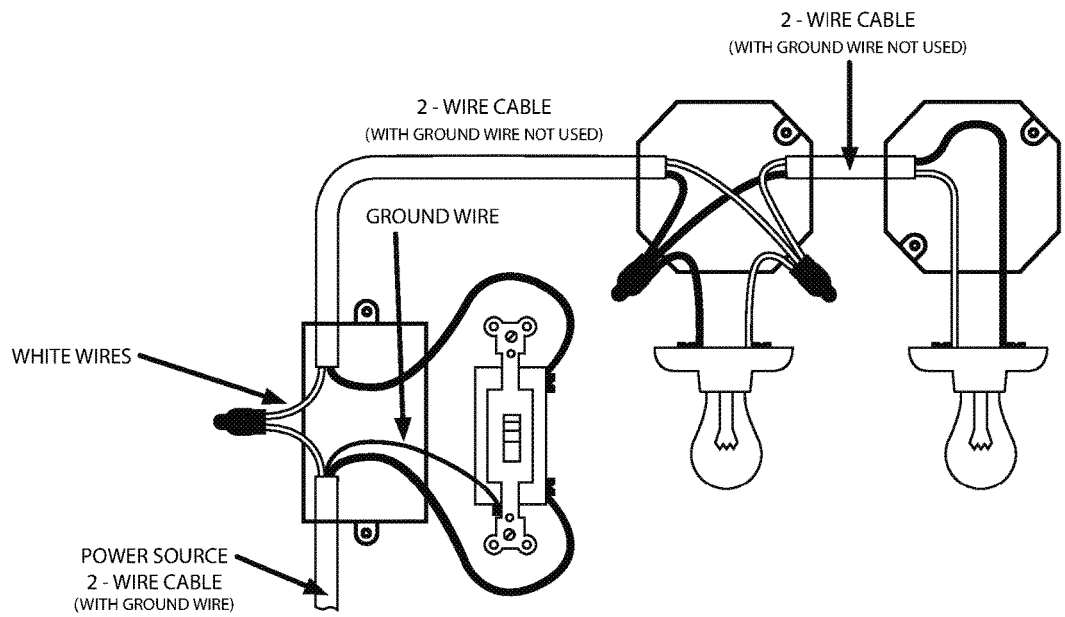
Figure 16E:
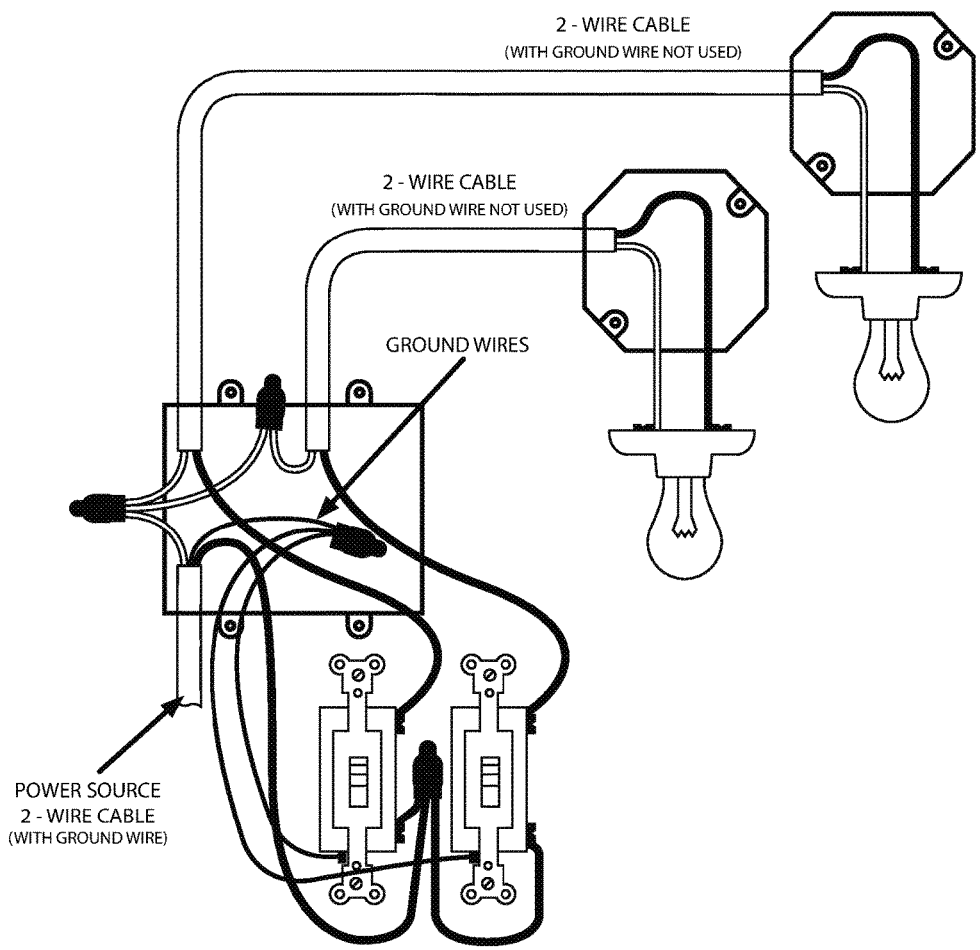
Figure 16F:
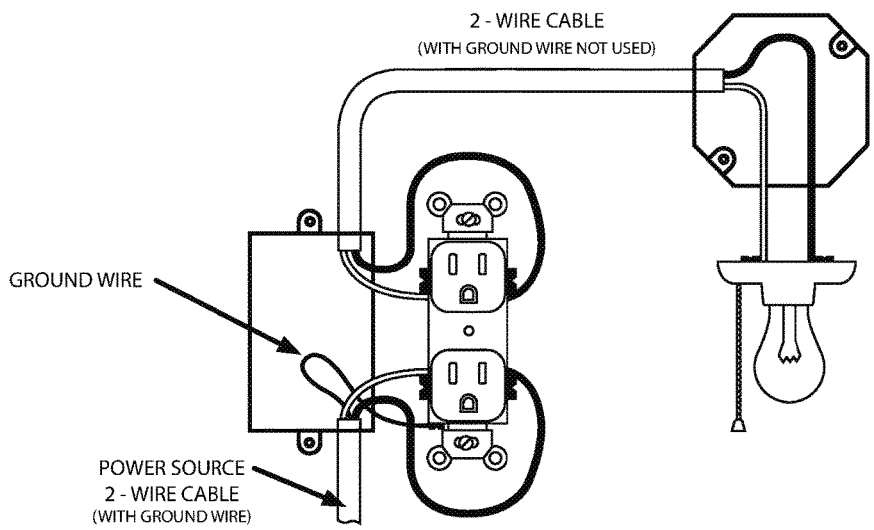
Figure 16F:
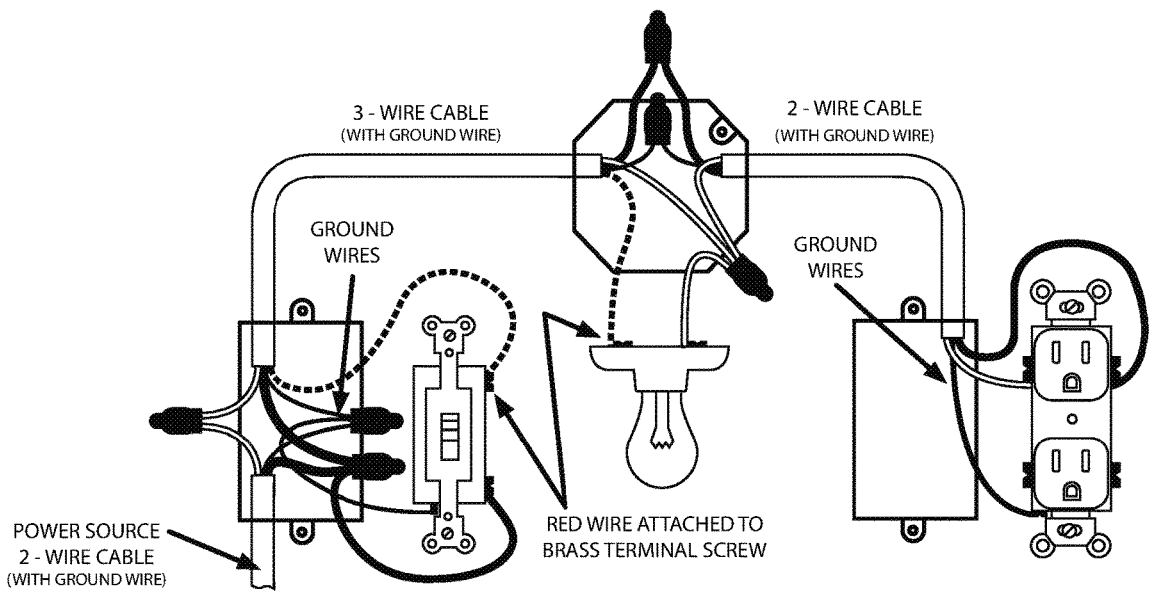
Figure 16G:
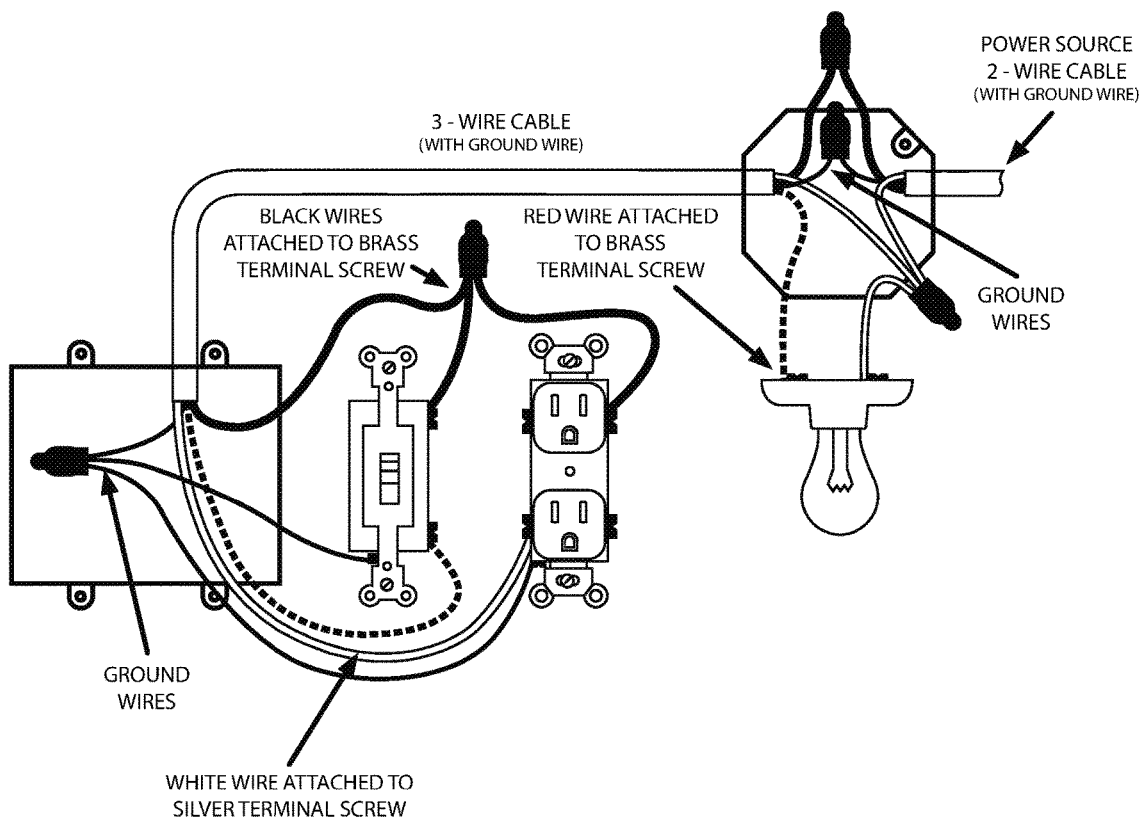
Figure 16H:
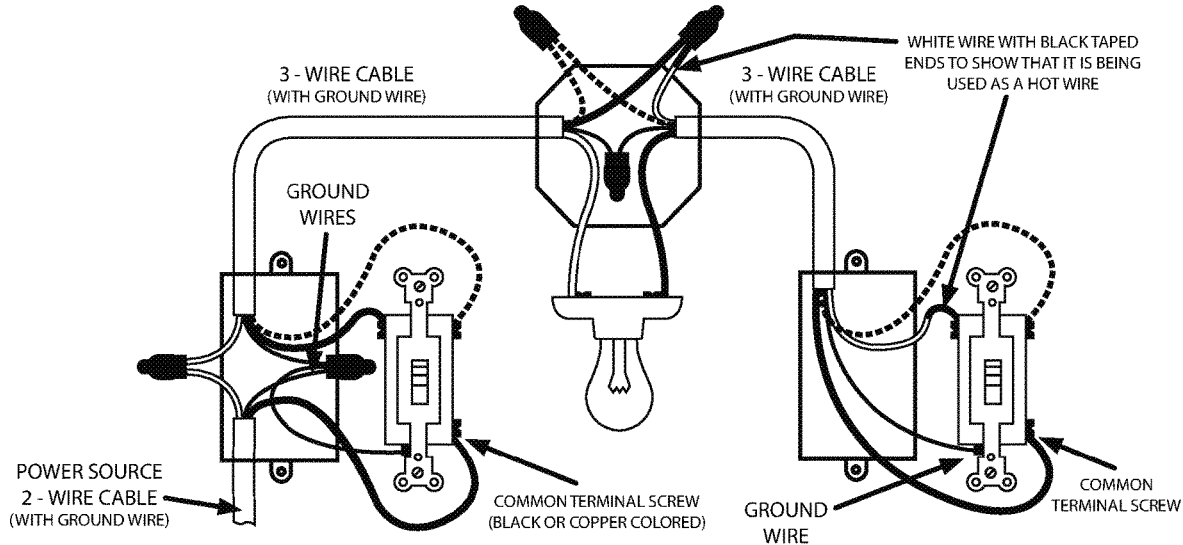
Figure 16H:
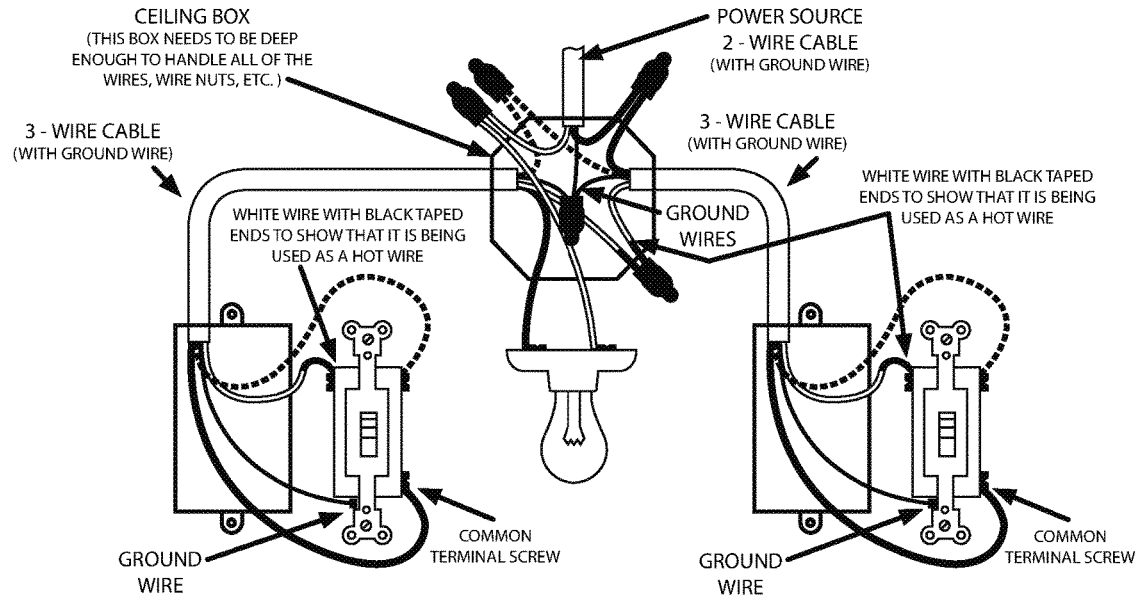
Figure 16I:
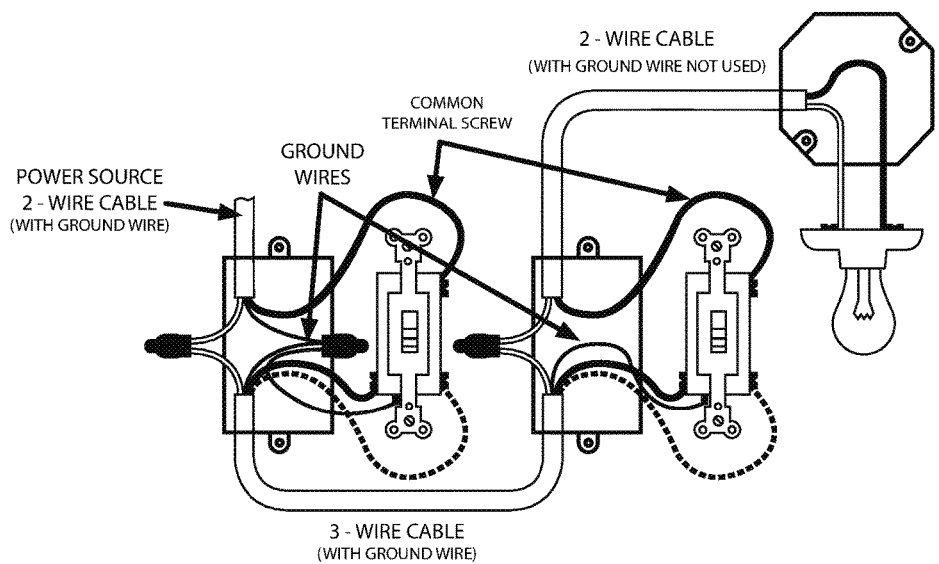
Figure 16I:
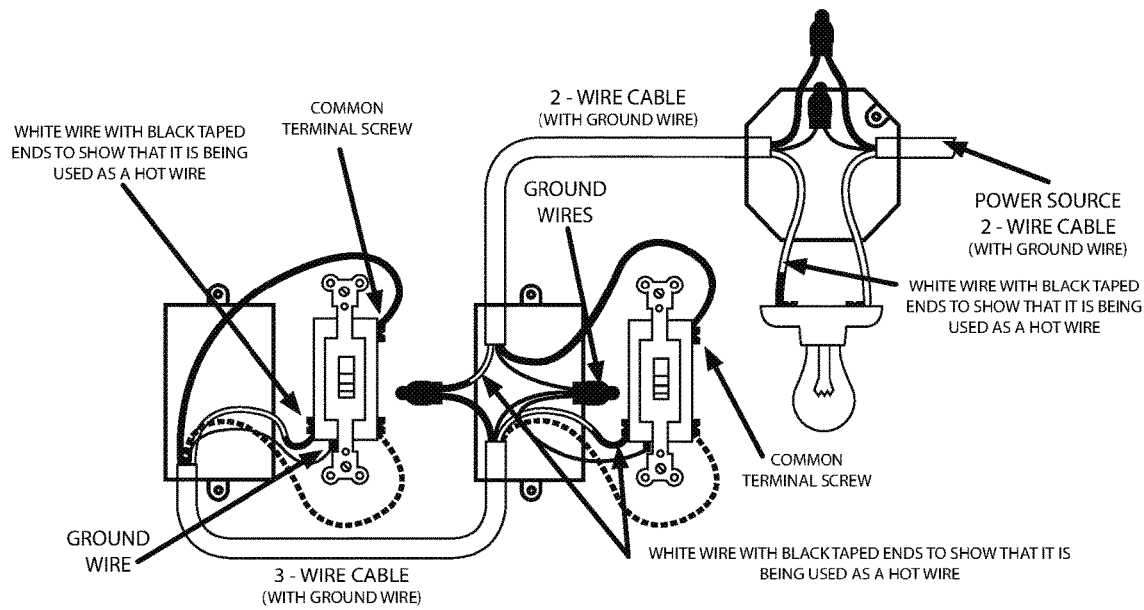
Figure 16J:
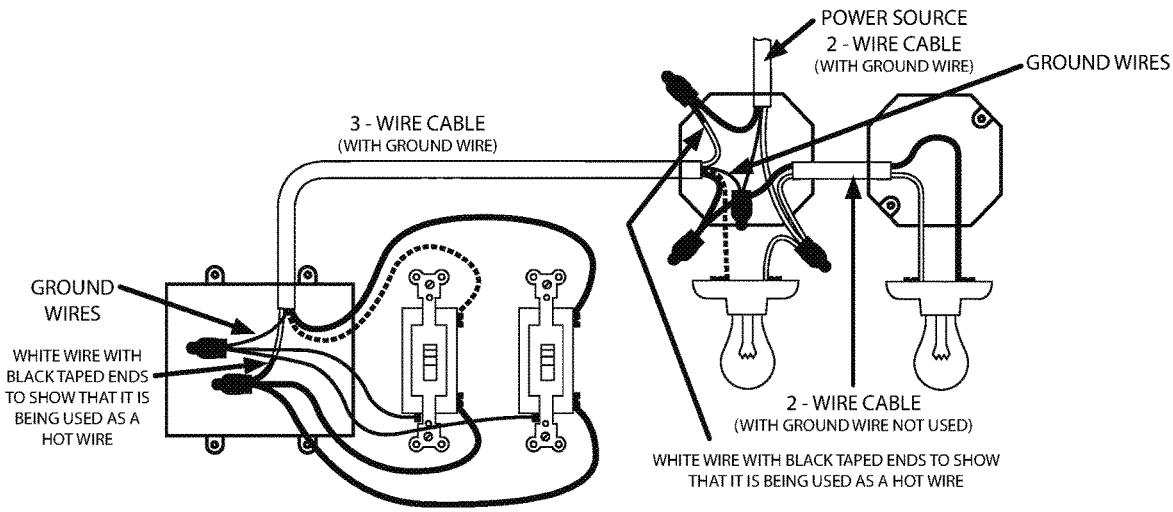
Figure 16J:
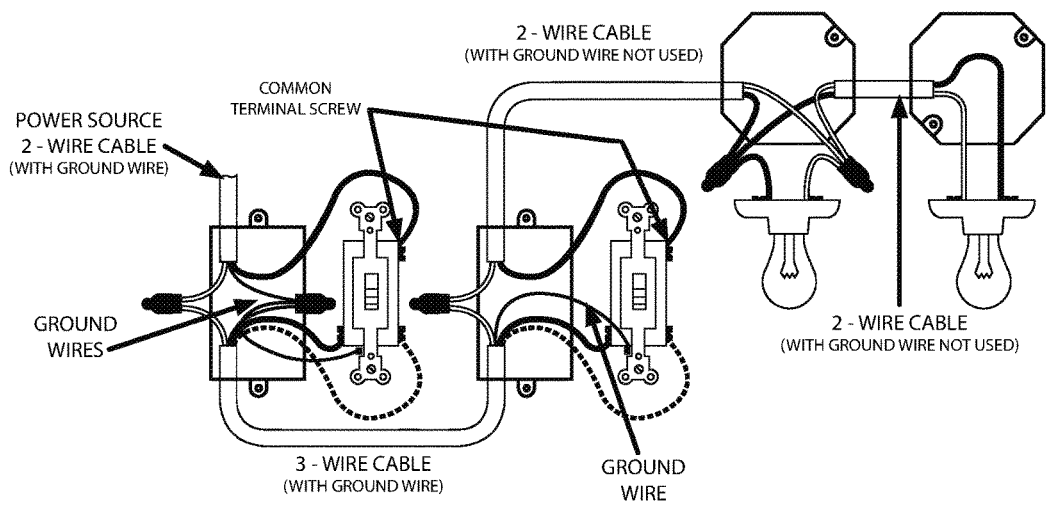
Figure 16K:
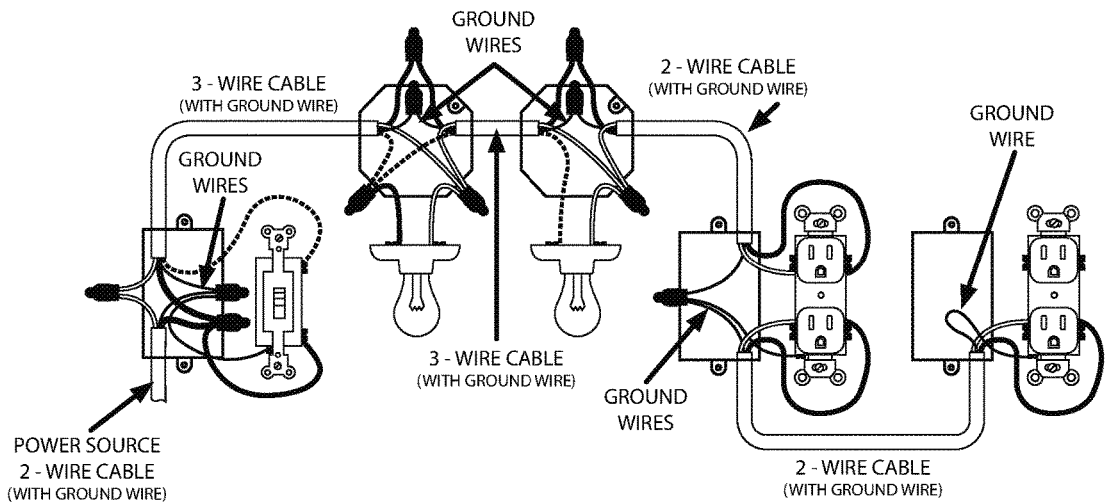
Figure 16K:
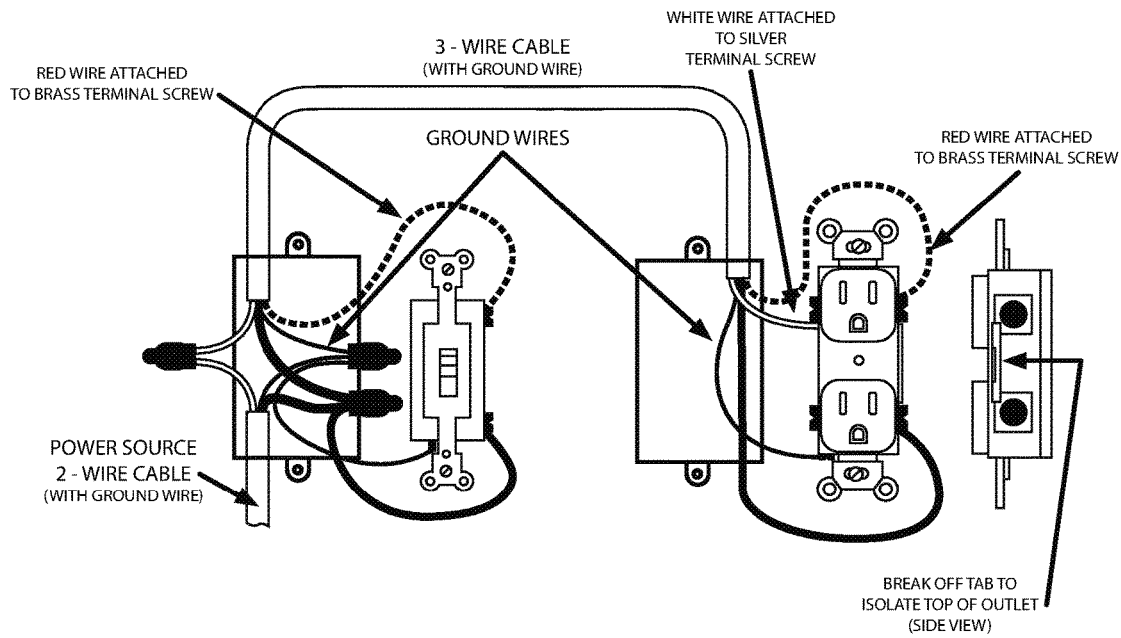

Referring to FIG. 12, batteries 200 are electrically connected to a system voltage regulator 201, hot voltage regulator 202, neutral voltage regulator 203, and a ground voltage regulator 204. The system voltage regulator 201 provides power to the onboard microcontroller 209 and other powered circuit components. Such connections are obvious to one skilled in the art of electronic design and are omitted to promote clarity.

The hot voltage regulator 202 would produce a signal unique from the neutral and ground signals, which would be run through a hot protection circuit 205 that would protect the circuit from damaging conditions such as overcurrent and overvoltage situations, and from there to the breakout box power connector 208.

The neutral voltage regulator 203 would produce a signal unique from the hot and ground signals, which would be run through a neutral protection circuit 206 that would protect the circuit from damaging conditions such as overcurrent and overvoltage situations, and from there to the breakout box power connector 208.

The ground voltage regulator 204 would produce a signal unique from the hot and neutral signals, which would be run through a ground protection circuit 207 that would protect the circuit from damaging conditions such as overcurrent and overvoltage situations, and from there to the breakout box power connector 208.

Signals from an outlet on the student wiring project would be received by the outlet test connector 212. The signals would run through an outlet protection circuit 211 which would protect against damaging overcurrent and overvoltage conditions. The signals would go through an additional outlet signal conditioning circuit 210 before arriving at the microcontroller 209 to be read and interpreted.

Signals from a light socket on the student wiring project would be received by the socket test connector 215. The signals would run through a socket protection circuit 214 which would protect against damaging overcurrent and overvoltage conditions. The signals would go through an additional socket signal conditioning circuit 213 before arriving at the microcontroller 209 to be read and interpreted.

The microcontroller 209 would then drive the outlet indicator array 216 and socket indicator array 217 to provide feedback to the user.

Exemplary Users Guide

The electrical wiring kit assists students in understanding and honing their skills in the world of electrical wiring. The electrical wiring kit is made up of a wall panel demonstrator, electrical components to complete wiring exercises and the electrical wiring assessment kit. When the assessment kit is hooked up to the wall panel demonstrator it will assess each wired fixture for correct wiring technique. The assessment kit is used to assess student wiring projects in a safe and timely manner. The assessment kit generates DC voltages to energize the student wiring project and then identifies the voltages at the outlets and/or sockets to determine whether the wiring is correct.

Electrical Wiring Kit Components
1. Wall Panel Demonstrator
2. Electrical Wiring Assessment Kit
3. Electrical Wiring Components
   Single Pole Switches (2)
   3-Way Switch (2)
   15A Duplex Receptacles (3)
   Ceramic Lamp Holders (2)
   Ceramic Lamp Holder, with pull chain (1)
   14-2 NM-B w/Ground Wire (20 feet)
   14-3 NM-B w/Ground Wire (13 feet)
   Standard Wire Connectors (25)
   Roll Black Electrical Tape (1)
4. Exercise Workbook
5. Quick Start Guide Electrical Wiring Kit Curriculum The electrical wiring kit comes with a three lesson curriculum and 16 electrical wiring exercises.

Electrical Wiring Kit Instructions

The electrical wiring assessment kit enables you to assess student wiring projects in a safe and timely manner. The assessment kit generates DC voltages to energize the student wiring project and then identifies the voltages at the outlets and/or sockets to determine whether the wiring is correct.

Batteries:

The electrical wiring assessment kit is powered by 4 AA alkaline batteries (batteries are included with product). Battery life is up to 40 hours of continuous usage (exact timing may vary). Batteries may remain installed in the assessment kit when not in use, as long as the power switch is switched to "OFF". Rechargeable AA cell batteries may also be used.

Turning the Assessment Kit on:

The power switch can be found in the upper right corner. When switched to "ON", the red "POWER INDICATOR" LED light below the switch should turn on. If it does not or light appears dim, replace or recharge the batteries. Low battery signal will appear when you turn on the assessment kit and the indicator lights flash 6 times rapidly. This will indicate that battery life is low and batteries should be changed out.

Light socket tester or outlet tester cables should be plugged into wall panel, breakout box, and assessment kit BEFORE turning on the assessment kit.

Tripping a Circuit on the Assessment Kit:

There is an internal circuit breaker inside the Assessment Kit. Under normal operating conditions, the red "BREAKOUT BOX POWER INDICATOR" LED will be lit. If this LED light goes out with the power switch turned on, the circuit has detected a short circuit and has turned off power to the breakout box on the wall panel. To reset this breaker, turn the assessment kit off and back on again. This will reconnect the circuit.

Features of Assessment Kit

Electrical Power for Testing Purposes:

The first step in testing wiring of the wall panel demonstrator is to provide power to it. The assessment kit is the power source for testing the electrical components in the wall panel demonstrator. Plug one end into the breakout box power connector in the upper right corner of assessment kit and the other end into the breakout box attached to the wall panel demonstrator.

An extra breakout box is located in the assessment kit for the purpose of attaching/mounting to any electrical wiring student wall project. The assessment kit can be used to test student's electrical projects. All electrical wiring should be wired directly from the breakout box, then use the assessment kit to understand the quality of wiring skill used for each and every fixture.

Outlet Testing

To test an outlet, the wall panel must be powered by the assessment kit. Plug the female end of the cable into the outlet test connector in the bottom right corner of the assessment kit. Plug the other end into the outlet on the wall panel that you wish to test. Compare the outlet test indicators on the assessment kit to Table 1 below, determine whether the outlet was wired correctly.

Never plug this cable into a standard outlet. This should only be used with a closed system powered solely by the kit itself. Doing so may permanently damage the outlet tester and/or assessment kit.

If no indicators are lit, check to ensure that the project power cable and outlet test cable are connected properly. Also turn on and off the power button to cycle power and reset the circuit breaker.

TABLE 1

Outlet Test Results
Compare Outlet Test Indicators on the Assessment Kit to the following to identify faults.

⊚⊚⊚ ○○ CORRECT
○○○○○ ALL TERMINALS OPEN
○ ⊚⊚ ○○ HOT TERMINAL OPEN
⊚ ○ ⊚ ○○ NEUTRAL TERMINAL OPEN
⊚⊚ ○○○ GROUND TERMINAL OPEN
⊚⊚ ○ ○● HOT AND NEUTRAL TERMINAL MISWIRED
⊚ ○ ⊚● HOT AND GROUND TERMINAL MISWIRED
○ ⊚⊚ ○● NEUTRAL AND GROUND TERMINAL MISWIRED
○○○○ ● MULTIPLE OPENS
○○○ ○● MULTIPLE HOTS, NEUTRALS OR GROUNDS

Light Socket Testing

To test a light socket, the wall panel must be powered by the assessment kit. Install one of the light socket testers in each light socket. There is a LED light on each of these adapters that will turn on as a standard bulb would in a typical circuit. This can be used to test single, 3-way, and 4-way light circuits to ensure lights turn on and off as expected.

To get more information about how the socket was wired, connect the cable to the socket test connector on the assessment kit and to the light socket tester. Compare the socket test indicators to Table 2 below, to determine whether the socket was wired correctly.

Never plug the light socket tester into a standard socket connected to AC power. This should only be used with a closed system powered solely by the assessment kit itself. Connecting to AC power so may permanently damage the light socket tester and/or assessment kit.

If no indicators are lit, check to ensure that the breakout box power cable and socket test cable are connected properly. Also turn on and off the power button to cycle power and reset the circuit breaker.

TABLE 2

Light Socket Test Results
Explanation of what the Pattern Actually Means

⊚⊚ ○○ CORRECT
○○○○ BOTH TERMINALS OPEN
○○ ● ○ HOT TERMINAL OPEN
○ ⊚ ○○ NEUTRAL TERMINAL OPEN
⊚ ○○○ HOT/NEUTRAL SWAPPED
○ ⊚ ○ ● HOT CONNECTED TO BOTH TERMINALS
○ ⊚● ○ GROUND CONNECTED TO NEUTRAL TERMINAL
⊚ ○○ ● NEUTRAL CONNECTED TO BOTH TERMINALS
⊚⊚● ○ GROUND CONNECTED TO HOT TERMINAL

Wall Panel Demonstrator

The wall panel demonstrator should be used with the electrical wiring assessment kit to practice basic wiring skills and train proper wiring technique.

Wall Panel Demonstrator Components
1 Wall Panel Demonstrator
2. Electrical Wiring Components
  (2) Single Pole Switches
  (2) 3-Way Switch
  (3) 15A Duplex Receptacles
  (2) Ceramic Lamp Holders
  (1) Ceramic Lamp Holder, with pull chain
  (40 feet) 14-2 NM-B w/Ground Wire
  (15 feet) 14-3 NM-B w/Ground wire
  (25) Standard Wire Connectors
  (1) Roll Black Electrical Tape The wall panel demonstrator function is to allow for users to do the 16 different wiring exercises (12 exercises, 4 enhancement exercises).

Student Exercise Booklet

Referring to FIGS. 16A-K, the student exercise booklet is a reproducible booklet of 16 different wiring exercise diagrams. The purpose of the diagrams is to show the correct wiring of each exercise and allow the user to then correctly wire the wall panel demonstrator according to the diagram. Use the electrical wiring kit to assess the quality of wiring skill.

We claim:

1. A system for assessing electrical wiring skills, comprising:
    (a) a low voltage power source,
    (b) electrical cabling that includes at least a hot, a neutral and a ground wire, operable for forming an electrical circuit from the power source and at least one wired electrical fixture, and
    (c) an electrical assessment circuit operable for electrical connection to the powered electrical fixture for (i) causing transmission of a unique power signal through each of the hot, neutral and ground wires in the electrical circuit whereby each wire can be electrically identified, (ii) detecting correctness of wired connections on the at least one electrical fixture, and (iii) reporting via a human perceptible signal any defects in the wired connections including an identification of the specific wire or wires that are incorrectly connected.

2. The system of claim 1 further comprising a student wiring project that includes (A) the at least one electrical fixture selected from an outlet, a switch and a light socket, and (B) electrical cabling for wiring the at least one electrical fixture.

3. An experiential electrical wiring training method, comprising the steps of:
    (a) wiring a student wiring project with electrical cabling that includes at least a hot, a neutral and a ground wire,
    (b) energizing the student wiring project with a low voltage power source,
    (c) providing each of the hot, neutral and ground wires of the wired student wiring project with a unique electrical signal,
    (d) assessing correctness of the wired connections made in the wired student wiring project using electrical assessment circuitry capable of detecting an incorrectly wired connection and which wire, as between the hot, neutral and ground wires, are incorrectly connected using the unique electrical signals, and
    (e) reporting via a human perceptible signal any defects in the wired connections including an identification of the specific wire or wires as between the hot, neutral and ground wires that are incorrectly connected.

* * * * *